US00RE47843E

(19) United States
(12) Reissued Patent
Fujii

(10) Patent Number: US RE47,843 E
(45) Date of Reissued Patent: Feb. 4, 2020

(54) COMMUNICATION APPARATUS AND COMMUNICATION LAYER ROLE DECIDING METHOD

(71) Applicant: CANON KABUSHIKI KAISHA, Tokyo (JP)

(72) Inventor: Kenichi Fujii, Tokyo (JP)

(73) Assignee: Canon Kabushiki Kaisha, Tokyo (JP)

(21) Appl. No.: 14/464,641

(22) Filed: Aug. 20, 2014

Related U.S. Patent Documents

Reissue of:
(64) Patent No.: 8,248,961
Issued: Aug. 21, 2012
Appl. No.: 12/159,167
PCT Filed: Feb. 15, 2007
PCT No.: PCT/JP2007/053241
§ 371 (c)(1),
(2) Date: Jun. 25, 2008
PCT Pub. No.: WO2007/094512
PCT Pub. Date: Aug. 23, 2007

(30) Foreign Application Priority Data

Feb. 17, 2006 (JP) ..... 2006-040959
Dec. 28, 2006 (JP) ..... 2006-354429

(51) Int. Cl.
*H04L 12/28* (2006.01)
*H04L 29/08* (2006.01)

(52) U.S. Cl.
CPC ..... *H04L 67/14* (2013.01)

(58) Field of Classification Search
CPC . H04L 67/14; H04L 65/1066; H04L 65/1006; H04L 12/1813; H04L 69/24; H04W 76/00; H04M 7/00; G06F 9/54
See application file for complete search history.

(56) References Cited

U.S. PATENT DOCUMENTS

| | | | | |
|---|---|---|---|---|
| 6,754,200 | B1 | 6/2004 | Nishimura | |
| 6,912,205 | B2 * | 6/2005 | Perlman et al. | 370/254 |
| 7,002,924 | B2 * | 2/2006 | Braun et al. | 370/254 |
| 7,181,614 | B1 | 2/2007 | Gehrmann | |
| 7,263,070 | B1 * | 8/2007 | Delker et al. | 370/254 |
| 7,414,996 | B2 * | 8/2008 | Fan | 370/338 |
| 7,493,371 | B1 * | 2/2009 | Bali et al. | 709/209 |

(Continued)

FOREIGN PATENT DOCUMENTS

| | | |
|---|---|---|
| EP | 1107522 A1 | 6/2001 |
| JP | 11-243419 A | 9/1999 |

(Continued)

OTHER PUBLICATIONS

XP002521028 "pppd-Point-to-Point Protocol Daemon"; Nov. 11, 2005; pp. 1-37.

(Continued)

*Primary Examiner* — Nick Corsaro
(74) *Attorney, Agent, or Firm* — Canon U.S.A., Inc. IP Division

(57) ABSTRACT

When setting a communication parameter, apparatuses decide on each other's roles for setting the communication parameter. When constructing a new network after the communication parameter is set, the roles of individual communication layers (e.g., a physical layer, IP layer, transport layer, and application layer) are decided on to correspond to the roles when the communication parameter is set.

23 Claims, 20 Drawing Sheets

(56) References Cited

U.S. PATENT DOCUMENTS

| | | | | |
|---|---|---|---|---|
| 7,532,585 | B2 * | 5/2009 | Kim et al. | 370/254 |
| 7,580,701 | B2 * | 8/2009 | Ross et al. | 455/411 |
| 7,673,143 | B1 * | 3/2010 | Yeager et al. | 713/175 |
| 2001/0012757 | A1 | 8/2001 | Boyle | |
| 2002/0147819 | A1 | 10/2002 | Miyakoshi et al. | |
| 2003/0027526 | A1 * | 2/2003 | Hillyard | 455/41 |
| 2003/0204625 | A1 * | 10/2003 | Cain | 709/243 |
| 2004/0165587 | A1 * | 8/2004 | Kiyoto et al. | 370/389 |
| 2005/0058109 | A1 * | 3/2005 | Ekberg | 370/338 |
| 2005/0086273 | A1 * | 4/2005 | Loebbert | H04W 84/20 |
| 2005/0094575 | A1 | 5/2005 | Park | |
| 2005/0163078 | A1 * | 7/2005 | Oba | H04L 63/08 370/331 |
| 2005/0188069 | A1 * | 8/2005 | Mohandas | 709/223 |
| 2007/0117586 | A1 * | 5/2007 | Billmaier et al. | 455/552.1 |
| 2007/0167187 | A1 * | 7/2007 | Rezvani et al. | 455/550.1 |

FOREIGN PATENT DOCUMENTS

| | | | |
|---|---|---|---|
| JP | 2000-269985 | A | 9/2000 |
| JP | 2002-359623 | A | 12/2002 |
| JP | 2003-513513 | A | 4/2003 |
| JP | 2006-005844 | A | 1/2006 |
| WO | 01/31836 | A2 | 5/2001 |
| WO | WO 0141371 | A1 * | 6/2001 |

OTHER PUBLICATIONS

XP002521029 "Autoconfiguration for IP Networking"; May 2001-Jun. 2001; pp. 81-86.

"IEEE Std 802.11 Information technology—Telecommunications and information exchange between systems—Local and metropolitan area networks—Specific requirements Part 11", Aug. 2005.

"HP Photosmart 2700 All-in-One Series Overview—HP Small & Medium Business Products." Web. Nov. 2, 2011. <http://h10010.www1.hp.com/wwpc/us/en/sm/WF05a/18972-238444-410635-421-635457-391138.html>.

* cited by examiner

2
S915
IS THERE IMAGE TRANSMISSION REQUEST?
NO
YES
S916
IMAGE RECEIVING STATE?
YES
S917
NOTIFY USER OF RECEIVING STATE
NO
TRANSMIT SendObject
S918
S919
IS OK RECEIVED?
NO
YES
TRANSMIT IMAGE
S920
S921
IS OK RECEIVED?
NO
YES
S922
IS EVENT RECEIVED?
NO
YES
IMAGE RECEIVING STATE
S923
TRANSMIT GetObject
S924
SAVE / DISPLAY RECEPTION
S925
TRANSMIT OK
S926
S927
IS THERE DISCONNECTION REQUEST?
NO
YES
END

FIG. 12

LIST OF ROLES IN COMMUNICATION LAYERS

| | |
|---|---|
| PHYSICAL LAYER ROLE | Joiner OR Creator |
| IP LAYER ROLE | RARP Server OR RARP Client |
| TRANSPORT LAYER ROLE | Initiator OR Responder |
| APPLICATION LAYER PRIORITY CONTROL | PRESENT OR ABSENT |

PARAMETER ACCEPTOR

PARAMETER PROVIDER

| | |
|---|---|
| PHYSICAL LAYER ROLE | Joiner |
| IP LAYER ROLE | RARP Client |
| TRANSPORT LAYER ROLE | Initiator |
| APPLICATION LAYER PRIORITY CONTROL | PRESENT |

ROLES SET IN CAMERA 2

| | |
|---|---|
| PHYSICAL LAYER ROLE | Creator |
| IP LAYER ROLE | RARP Server |
| TRANSPORT LAYER ROLE | Responder |
| APPLICATION LAYER PRIORITY CONTROL | ABSENT |

ROLES SET IN CAMERA 1

FIG. 14

LIST OF ROLES IN COMMUNICATION LAYERS

| | |
|---|---|
| PHYSICAL LAYER ROLE | Joiner OR Creator |
| IP LAYER ROLE | RARP Server OR RARP Client |
| TRANSPORT LAYER ROLE | Initiator (Client) OR Responder (Server) |
| TRANSPORT PROTOCOL | HTTP OR PTP / IP |

PARAMETER ACCEPTOR

| | |
|---|---|
| REGISTERED PARTNER INFORMATION | HDD |
| PHYSICAL LAYER ROLE | Joiner |
| IP LAYER ROLE | RARP Client |
| TRANSPORT LAYER ROLE | Client |
| TRANSPORT PROTOCOL | HTTP |

ROLES SET IN CAMERA

PARAMETER PROVIDER

| | |
|---|---|
| REGISTERED PARTNER INFORMATION | CAMERA |
| PHYSICAL LAYER ROLE | Creator |
| IP LAYER ROLE | RARP Server |
| TRANSPORT LAYER ROLE | Server |
| TRANSPORT PROTOCOL | HTTP |

ROLES SET IN HDD

COMMUNICATION APPARATUS AND COMMUNICATION LAYER ROLE DECIDING METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates to a communication apparatus and communication layer role deciding method, e.g., a communication apparatus and role deciding method which decide on roles in a plurality of communication layers when performing communication between communication apparatuses.

BACKGROUND ART

To transfer data such as an image between communication apparatuses, it is necessary to establish a physical layer, decide on an IP address to be used in an IP (Internet Protocol) layer, and establish a transport layer between the communication apparatuses (U.S. Pat. No. 6,754,200 (Japanese Patent Laid-Open No. 11-243419)).

The IEEE802.11 standards define ad hoc communication requiring no access point function. When performing wireless communication across an ad hoc network using this ad hoc communication, it is necessary to establish the individual communication layers described above.

To establish these communication layers in the ad hoc network, each device must execute a role in each communication layer.

The roles of the individual communication layers in the ad hoc network, e.g., the roles of the physical layer are a joiner and creator as functional roles in the ad hoc mode of a wireless LAN. Also, the roles of the IP layer as an upper layer are an RARP server and RARP client as functional roles which resolve an IP address from a MAC address.

In addition, the roles of the transport layer as a still upper layer are an initiator and responder of PTP (Picture Transfer Protocol)/IP communication. Furthermore, an application layer as a still upper layer has a role of deciding which device is to be given priority control if control operations of these devices conflict with each other in the application layer.

In the ad hoc network described above, the relationships between individual devices are equal. Therefore, each device cannot determine a role to be executed in each communication layer, and hence must execute both the roles. That is, as the roles of the physical layer, each device executes both the roles of the joiner and creator as the functional roles in the ad hoc mode. Also, as the roles of the IP layer, each device executes both the roles of the RARP server and RARP client. Additionally, as the roles of the transport layer, each device executes both the roles of the initiator and responder of PTP/IP communication. Furthermore, as the role of the application layer, each device must perform communication for deciding on the priority control.

This increases the processing load on each device. The processing load particularly increases in a built-in device having limited resources such as a CPU and memory, and interferes with other processes.

If the role of each communication layer is set by a user operation in order to reduce the processing load, the user is forced to perform advanced, complicated settings.

Also, to perform communication between a plurality of apparatuses by imparting the functional role of each communication layer to one apparatus, for example, the user is forced to perform menu selection for limiting roles such as an image sender and image receiver at the time of activation of communication. The user is also forced to perform menu selection for limiting roles such as a communication server and communication client. This makes the user unable to satisfy the demand for performing communication in an equal relationship from the user's viewpoint.

DISCLOSURE OF INVENTION

The present invention has been made in consideration of the above situation, and has as its object to achieve one of the following objects.

To readily decide the role of each communication layer with respect to a communication partner.

To rapidly decide the role of each communication layer without forcing the user to perform any complicated operations.

To allow the user to simply communicate with a partner without having to consider the role of each communication layer.

To reduce the processing load on a device.

Other objects of the present invention will become apparent from the following explanation.

The present invention is characterized by deciding on a role when setting communication parameters with another apparatus, and deciding and setting the role of at least one communication layer in accordance with the decided role.

Further features of the present invention will become apparent from the following description of exemplary embodiments (with reference to the attached drawings).

BRIEF DESCRIPTION OF DRAWINGS

FIG. 12 is a view showing the roles of communication layers to be allocated to a parameter provider and parameter acceptor when cameras communicate with each other;

FIG. 14 is a view showing the roles of communication layers to be allocated to a parameter provider and parameter acceptor when a camera and storage device communicate with each other.

BEST MODE FOR CARRYING OUT THE INVENTION

A preferred embodiment of the present invention will now be described in detail with reference to the drawings.

Each apparatus to be explained below performs wireless communication complying with the IEEE802.11 standards. Wireless communication complying with the IEEE802.11 standards will be referred to as wireless LAN communication hereinafter.

Also, each apparatus forms a setting network for setting parameters of a wireless network. Wireless communication parameters such as a network identifier (SSID (Service Set Identifier)), encryption scheme, encryption key, authentication scheme, and authentication key for forming the setting network are prestored in a memory such as a ROM. A first apparatus transmits wireless communication parameters for forming an image communication network to one or a plurality of apparatuses across the setting network. When an apparatus having formed the setting network shares the wireless communication parameters for image communication, the first apparatus terminates the communication across the setting network, forms a new image communication network, and communicates an image.

In the following explanation, an apparatus which transmits and provides the wireless communication parameters of an image communication network to another apparatus will be called a parameter provider. An apparatus which accepts the wireless communication parameters of an image communication network will be called a parameter acceptor. Also, the process of providing and accepting the wireless communication parameters will be called a parameter exchanging process or exchanging process.

Furthermore, this embodiment will take the network identifier (SSID (Service Set Identifier)), encryption scheme, encryption key, authentication scheme, and authentication key as examples of the wireless LAN parameters. However, other parameters for forming an image communication network may also be used. It is also possible to use parameters or other information necessary to communicate an image after the network is formed.

Figure 1:
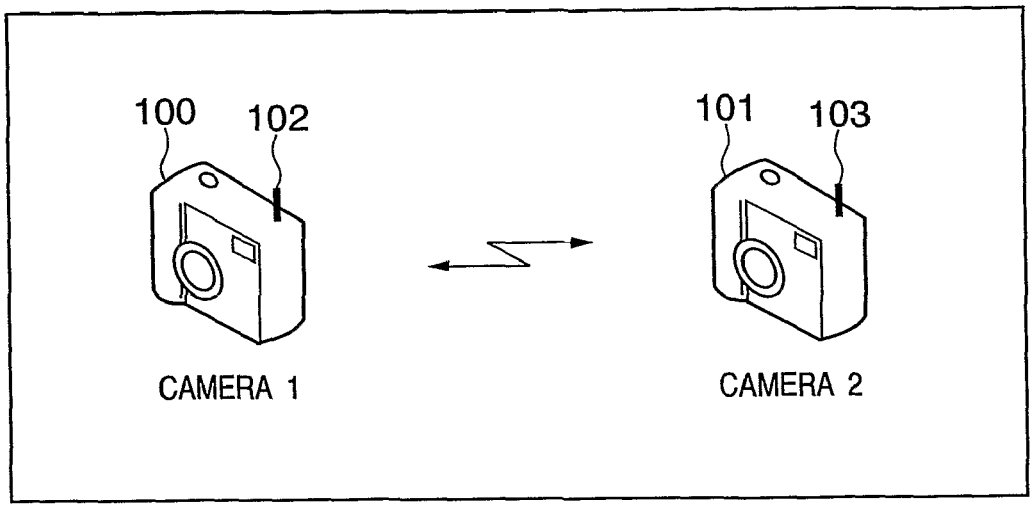
FIG. 1 is a view showing a case in which cameras communicate with each other.

In FIG. 1, reference numerals 100 and 101 denote wireless communication apparatuses according to this embodiment, and they are a camera 1-100 and camera 2-101. The camera 1-100 (to be referred to as camera 1 hereinafter) has a wireless communication function unit 102, and the camera 2-101 (to be referred to as camera 2 hereinafter) has a wireless communication function unit 103. The wireless communication function units 102 and 103 directly communicate with each other in the ad hoc mode complying with the IEEE802.11 standards. Note that wireless communication complying with the IEEE802.11 standards will be referred to as wireless LAN communication hereinafter.

Figure 3:
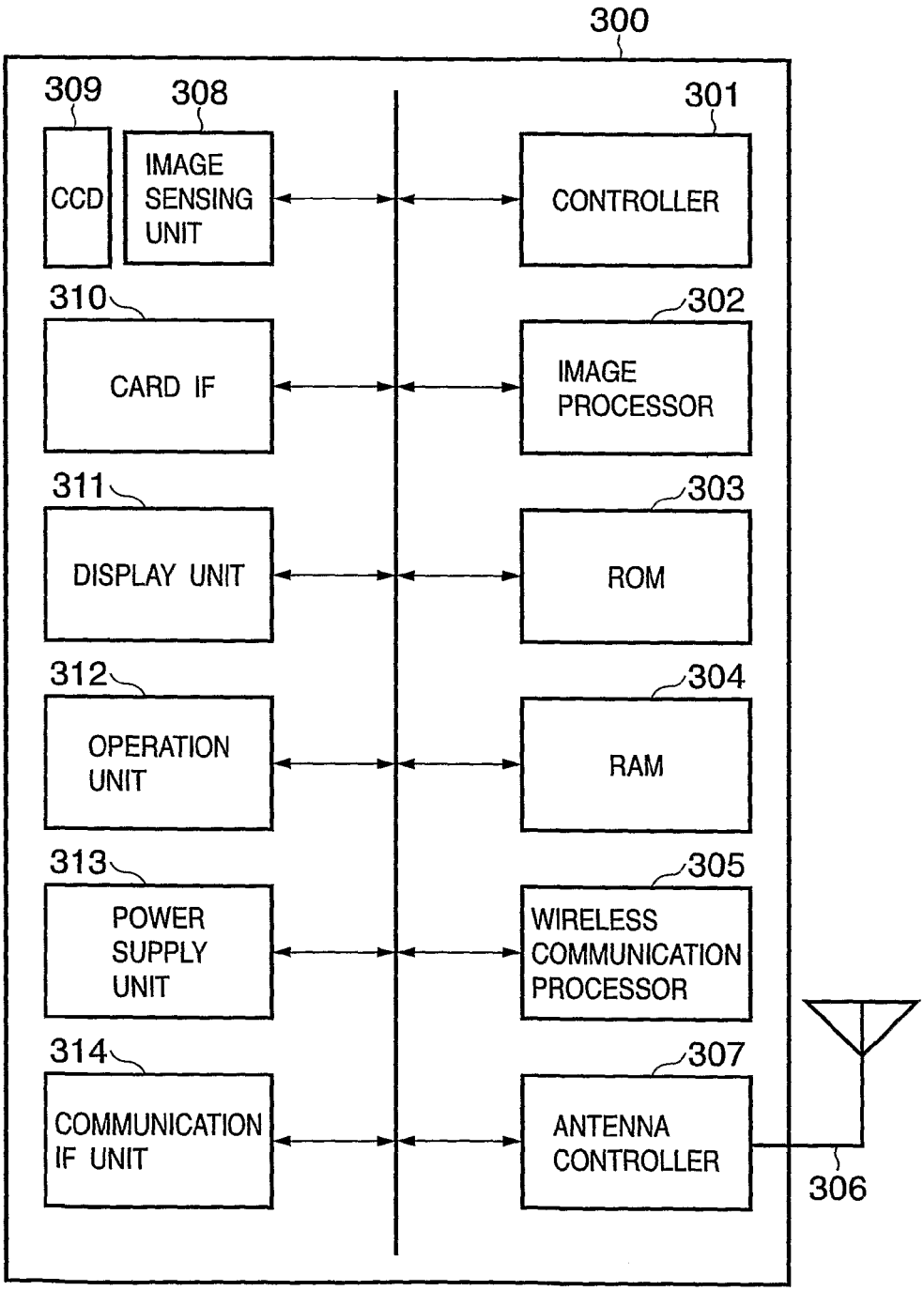
FIG. 3 is a block diagram of a digital camera.

FIG. 3 is a function block diagram of the cameras 1-100 and 2-101. Reference numeral 300 denotes the body of the camera; 301, a controller which controls the camera 300; 302, an image processor which performs reduction, image processing, and the like on a sensed image; and 303, a ROM storing control instructions, i.e., programs, and also storing programs for executing processing of the cameras 1 and 2 to be described later. The ROM 303 also stores tables (FIGS. 12, 13, and 14) for deciding the roles of communication layers corresponding to the partner of a wireless network parameter exchanging process as will be described later. Furthermore, the ROM 303 prestores the wireless communication parameters, such as the network identifier (SSID (Service Set Identifier)), encryption scheme, encryption key, authentication scheme, and authentication key, for forming a setting network.

Reference numeral 304 denotes a RAM used as a work area of the controller 301; 305, a wireless communication processor which controls wireless LAN communication; 306, an antenna; 307, an antenna controller; 308, an image sensing unit which receives an input pixel signal from a CCD 309; 310, a card interface which controls a recording medium card for storing sensed images and setting information; 311, a display unit which displays various data; 312, an operation unit including, e.g., operation buttons for performing various settings such as the activation of a wireless communication parameter setting process, photographing designation, and playback; 313, a power supply unit; and 314, a wired communication interface unit, e.g., a USB or IEEE1394.

FIG. 12 is a view showing the roles of individual communication layers applied when devices of the same type perform the wireless network parameter exchanging process. First, as the roles of a physical layer, each camera plays a joiner and creator as functional roles in the ad hoc mode of a wireless LAN. The creator forms an ad hoc network, and the joiner joins this network. The roles of an IP layer as an upper layer are an RARP server and RARP client as functional roles which resolve an IP (Internet Protocol) address from a MAC (Media Access Control) address. RARP is an abbreviation of Reverse Address Resolution Protocol, and the RARP client transmits an RARP request to the RARP server. A desired MAC address and the IP address and MAC address of the client are described in the RARP request. The RARP server returns, as an RARP response, an IP address corresponding to the MAC address notified by the RARP request, thereby obtaining the IP address from the MAC address. The RARP server can also recognize the relationship between the IP address and MAC address of the partner, from the IP address and MAC address of the partner described in the RARP request.

The roles of a transport layer as a still upper layer are an initiator and responder of PTP (Picture Transfer Protocol)/IP communication. The initiator transmits a PTP/IP connection request to the responder, and the responder returns a connection response, thereby performing PTP/IP connection. Also, the initiator and responder transfer images in the transport layer by communicating commands between them. For example, when transmitting data such as an image from the initiator to the responder, the initiator transmits SendObject to the responder. If the responder returns OK to the initiator, the initiator transmits the data. On the other hand, when transmitting data from the responder to the initiator, the responder notifies the initiator of Event. The initiator having received Event transmits GetObject to receive the data from the responder. The responder having received GetObject transmits the data to the initiator. An application layer as a still upper layer has a role of deciding which one of devices is to be given priority control if control operations of these devices conflict with each other in the application layer.

A case in which camera 2 is a parameter acceptor of a wireless network and camera 1 is a parameter provider of the wireless network as shown in FIG. 12 will be explained below. The roles of the individual communication layers of the parameter provider are decided such that the role of the physical layer is the creator, the role of the IP layer is the RARP server, the role of the transport layer is the PTP/IP responder, and priority control of the application layer is absent. Also, the roles of the individual communication layers of the parameter acceptor are decided such that the role of the physical layer is the joiner, the role of the IP layer is the RARP client, the role of the transport layer is the PTP/IP initiator, and priority control of the application layer is present.

Figure 5:
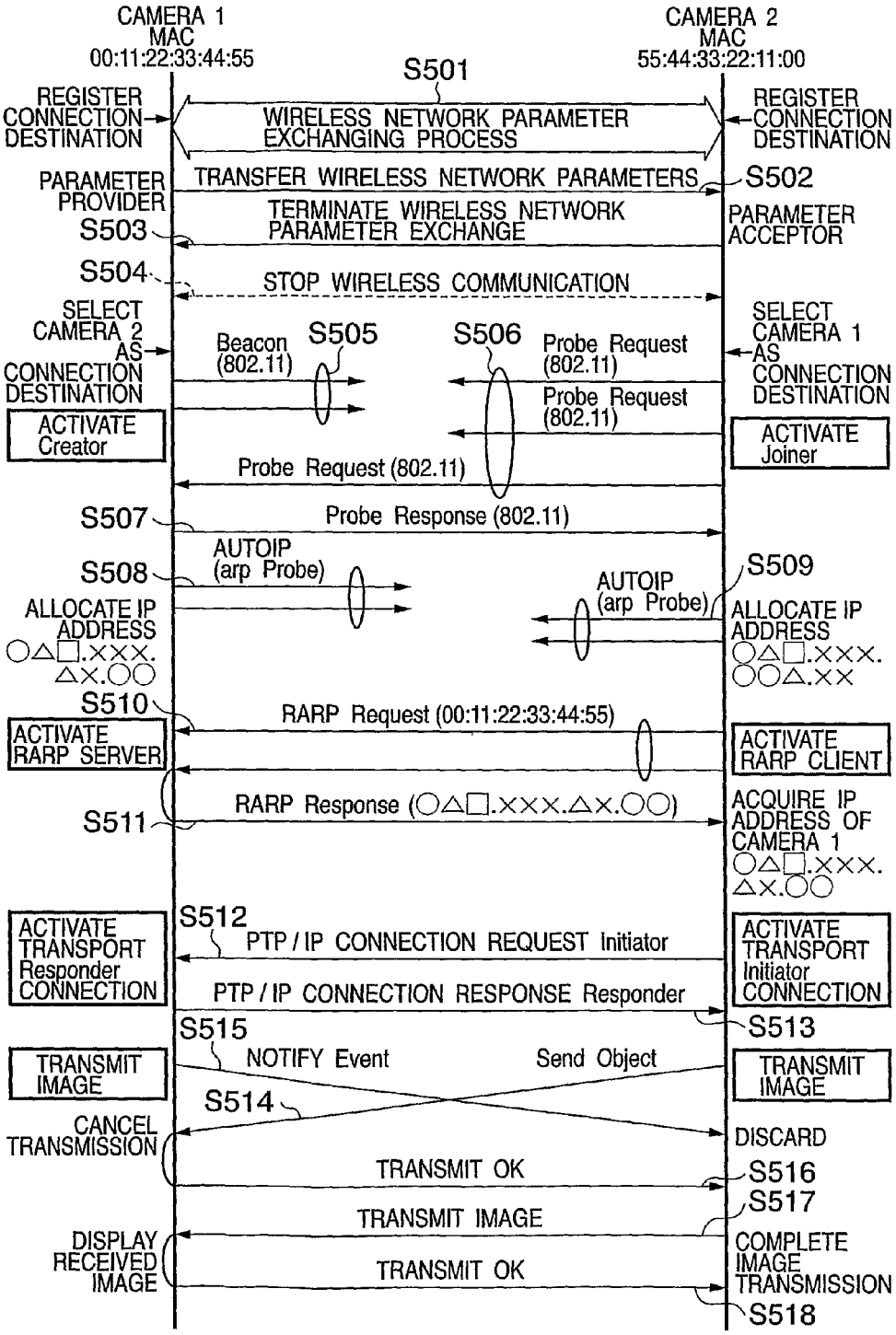
FIG. 5 is a sequence diagram showing operations when cameras communicate with each other.

FIG. 5 is a sequence diagram showing operations from the wireless network parameter exchanging process to image communication when the cameras perform image transmission.

First, prior to communication, cameras 1 and 2 exchange the wireless network parameters across the setting network in order to register each other's connection destination information (S501). In this exchanging process, whether the parameter exchanging process is performed between devices of the same type is determined. If it is determined that the parameter exchanging process is performed between devices of the same type, the roles shown in FIG. 12 are set. In this case, it is decided that camera 1 is the parameter provider and camera 2 is the parameter acceptor, so camera 1 transfers the wireless communication parameters to camera 2 (S502). When the exchanging process is complete (S503), cameras 1 and 2 stop wireless communication (S504), and resume wireless communication by selecting each other's connection destinations registered during the process. In this stage, cameras 1 and 2 form a new network by using the wireless communication parameters exchanged by the exchanging process.

Camera 1 is activated as a creator of the wireless physical layer and sends a beacon (S505). Camera 2 is activated as a joiner of the wireless physical layer, transmits a probe request to perform a scanning operation (S506), and waits for a probe response from camera 1 (S507). To decide its own IP address, camera 1 activates an AUTOIP function and decides on an IP address (S508). Likewise, camera 2 activates an AUTOIP function and decides on an IP address (S509). This AUTOIP function transmits anARP inquiry to determine whether there is another apparatus using an IP address desired by an apparatus having activated the AUTOIP function, and checks the presence/absence of duplication of the IP address based on a response. Each apparatus transmits anARP inquiry until there is no more duplication of an IP address, and decides on its own IP address.

Camera 1 activates an RARP server as the role of the IP layer, and camera 2 activates an RARP client as the role of the IP layer. Camera 2 designates the MAC address 00:11:22:33:44:55 of camera 1, and transmits an RARP request (S510). Camera 1 having received this RARP request notifies camera 2 of its own IP address (○Δ□.XXX.ΔX. ○○) as an RARP response (S511). Camera 1 also acquires the IP address of camera 2 from the contents of the received RARP request.

Subsequently, camera 1 activates a PTP/IP responder as the role of the transport layer, and camera 2 activates a PTP/IP initiator as the role of the transport layer. To perform PTP/IP connection of the transport layer with camera 1, camera 2 transmits a PTP/IP connection request to camera 1 (S512). When receiving this PTP/IP connection request, camera 1 transmits a PTP/IP connection response (S513).

Control for simultaneous image transmission by cameras 1 and 2 follows. To transmit an image, camera 1 notifies camera 2 of Event by PTP/IP (S515). To transmit an image, camera 2 transmits a request for SendObject to camera 1 by PTP/IP (S514). Since camera 2 has priority control of the application layer, camera 1 transfers a transmission process to camera 2 and transmits OK to notify camera 2 of transmission permission (S516). Camera 2 having received this OK transmits the image to camera 1 (S517). Camera 1 displays the received image and transmits OK to notify camera 2 that the image has been received (S518). In this case, camera 1 does not display any transmission failure on the display unit, but displays information indicating that the image receiving process is being executed. This makes it possible to notify the user of the progress of the process without confusion.

Figure 8A:
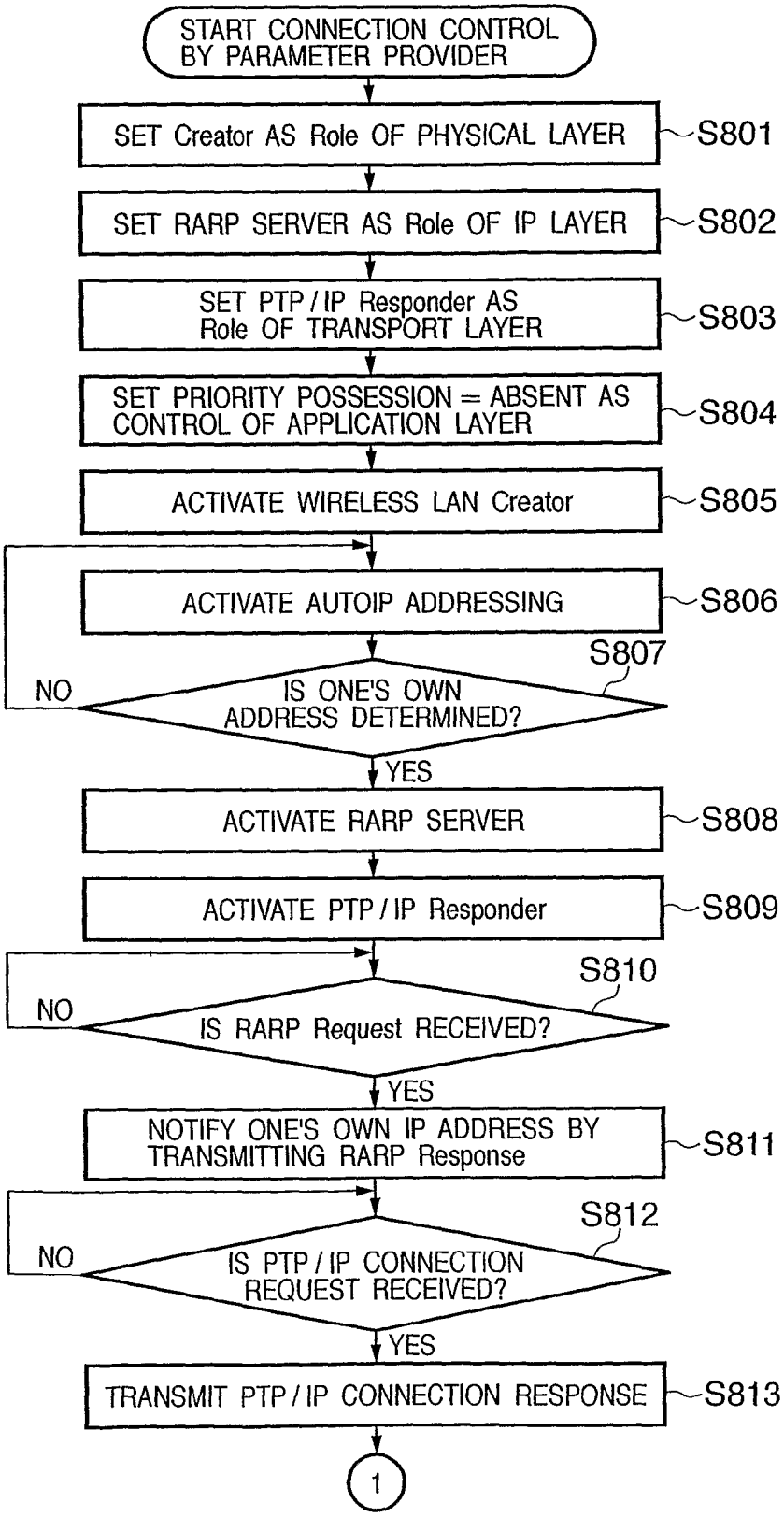
FIG. 8A is a flowchart showing the operation of a camera as a parameter provider when cameras communicate with each other.
Figure 8B:
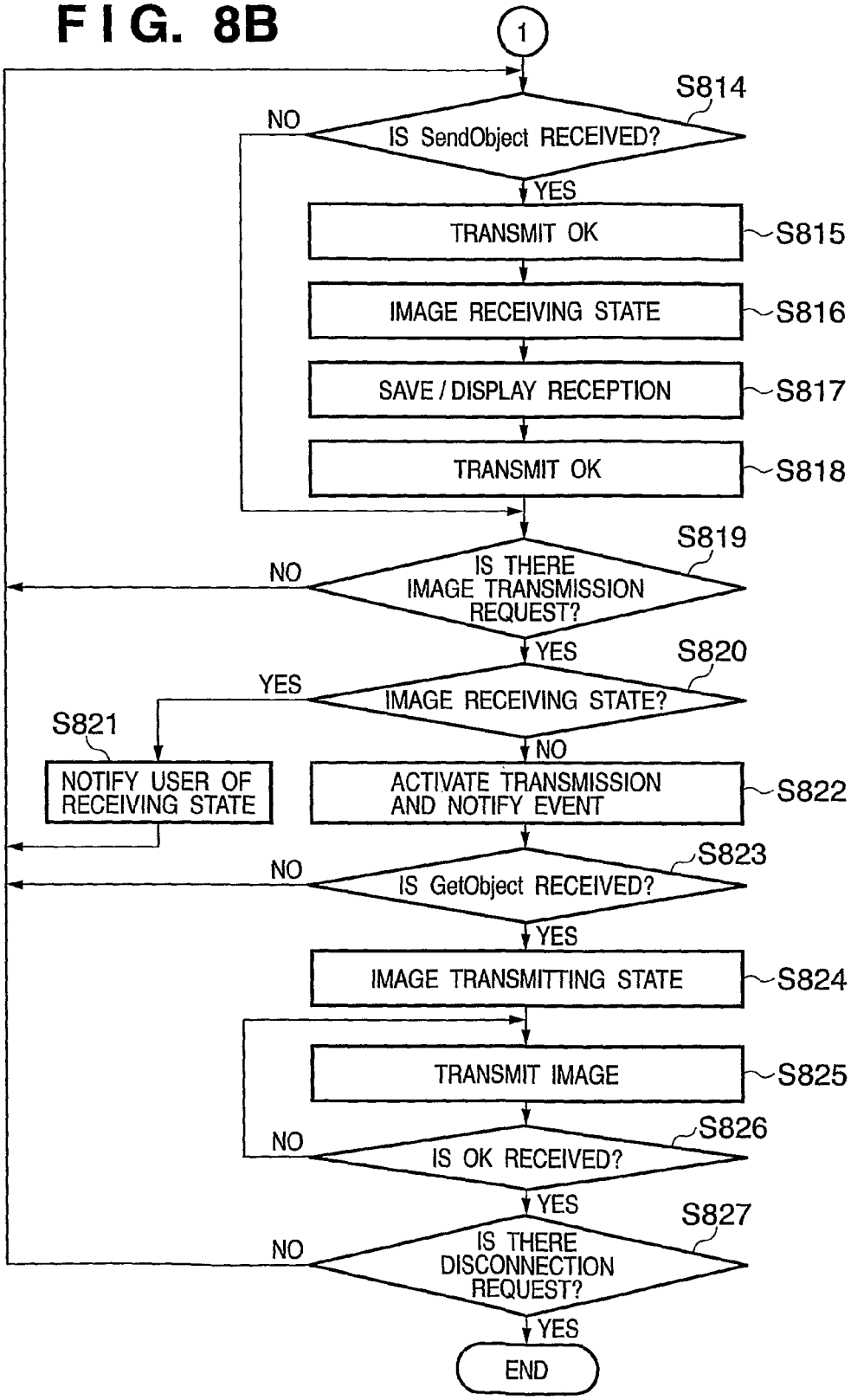
FIG. 8B is a flowchart showing the operation of the camera as a parameter provider when the cameras communicate with each other.

FIGS. 8A and 8B are flowcharts showing the operation of camera 1 as the parameter provider when the cameras communicate images with each other. When performing communication connection with camera 2, camera 1 as the parameter provider sets the roles of the individual communication layers as shown in FIG. 12.

When completing communication across the setting network, camera 1 first sets the physical layer as a creator (S801). Camera 1 then sets the IP layer as an RARP server (S802). Camera 1 also sets the transport layer as a PTP/IP responder (S803), and sets no priority control of the application layer (S804). After deciding on the roles of these layers, camera 1 starts the operation of the creator as the role of the wireless physical layer (S805). When forming a network as the creator, camera 1 activates AUTOIP addressing regardless of whether another apparatus is connected (S806). If its own IP address is determined by AUTOIP (S807), camera 1 activates an RARP server as the role of the IP layer (S808).

After that, camera 1 can respond to an address request from another RARP client. Subsequently, camera 1 activates a responder of PTP/IP as the role of the transport layer (S809). At this point, camera 1 can respond to a connection request from a PTP/IP initiator. If an RARP request is received after that (S810), camera 1 transmits an RARP response to notify the request source of its own IP address (S811). As a consequence, the two devices recognize each other's MAC addresses and IP addresses.

If a PTP/IP connection request is received after that (S812), camera 1 transmits a PTP/IP connection response (S813), and connects to camera 2 in the transport layer. Then, camera 1 checks the reception of SendObject in order to determine whether camera 2 as the connection partner has requested image transmission (S814). If SendObject is received, camera 1 transmits OK to camera 2 (S815), sets an image receiving state (S816), saves the received image and displays it on the display unit (S817), and transmits OK to the partner (S818). If no SendObject is received, the process advances to step S819.

If the user of camera 1 requests image transmission by operating the operation unit 312 (S819), camera 1 determines whether the image receiving state is already set (S820). If the image receiving state is already set, camera 1 notifies the user of the receiving state (S821), and the process returns to step S814. If no image receiving state is set (NO in S820), camera 1 activates a transmitting process and notifies camera 2 of EVENT (S822). If GetObject is received from camera 2 having received the EVENT notification (S823), camera 1 sets an image transmitting state (S824), and transmits an image (S825). If OK indicating reception completion is received from camera 2 having received the image (S826), camera 1 determines whether there is a request for disconnection from camera 2 (S827). If OK indicating reception completion is not received, camera 1 retransmits the image (S825). If there is a disconnection request, camera 1 disconnects from camera 2 and terminates the process (S827). If there is no disconnection request, the process returns to step S814.

Figure 9A:
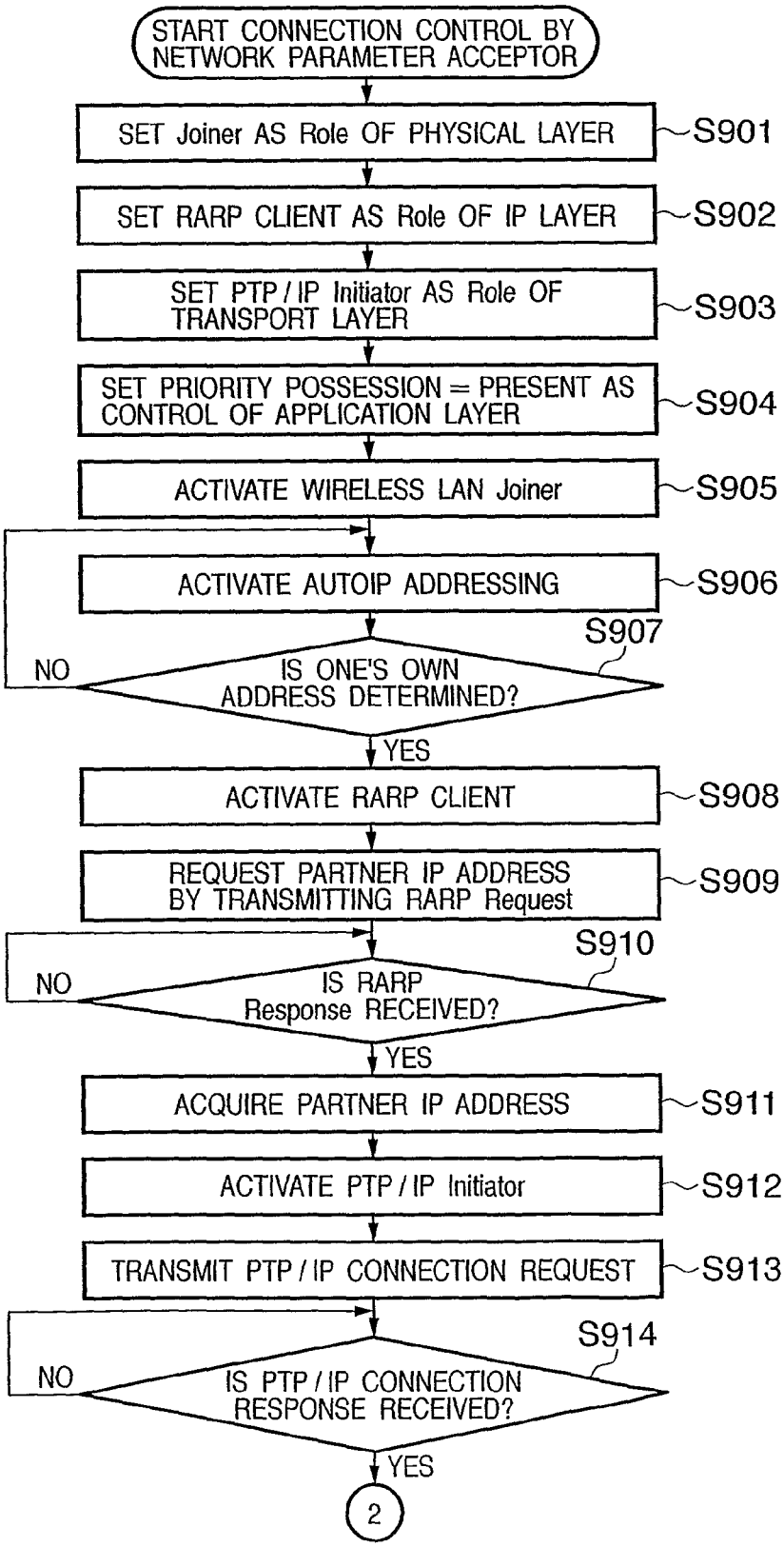
FIG. 9A is a flowchart showing the operation of a camera as a parameter acceptor when cameras communicate with each other.
Figure 9B:
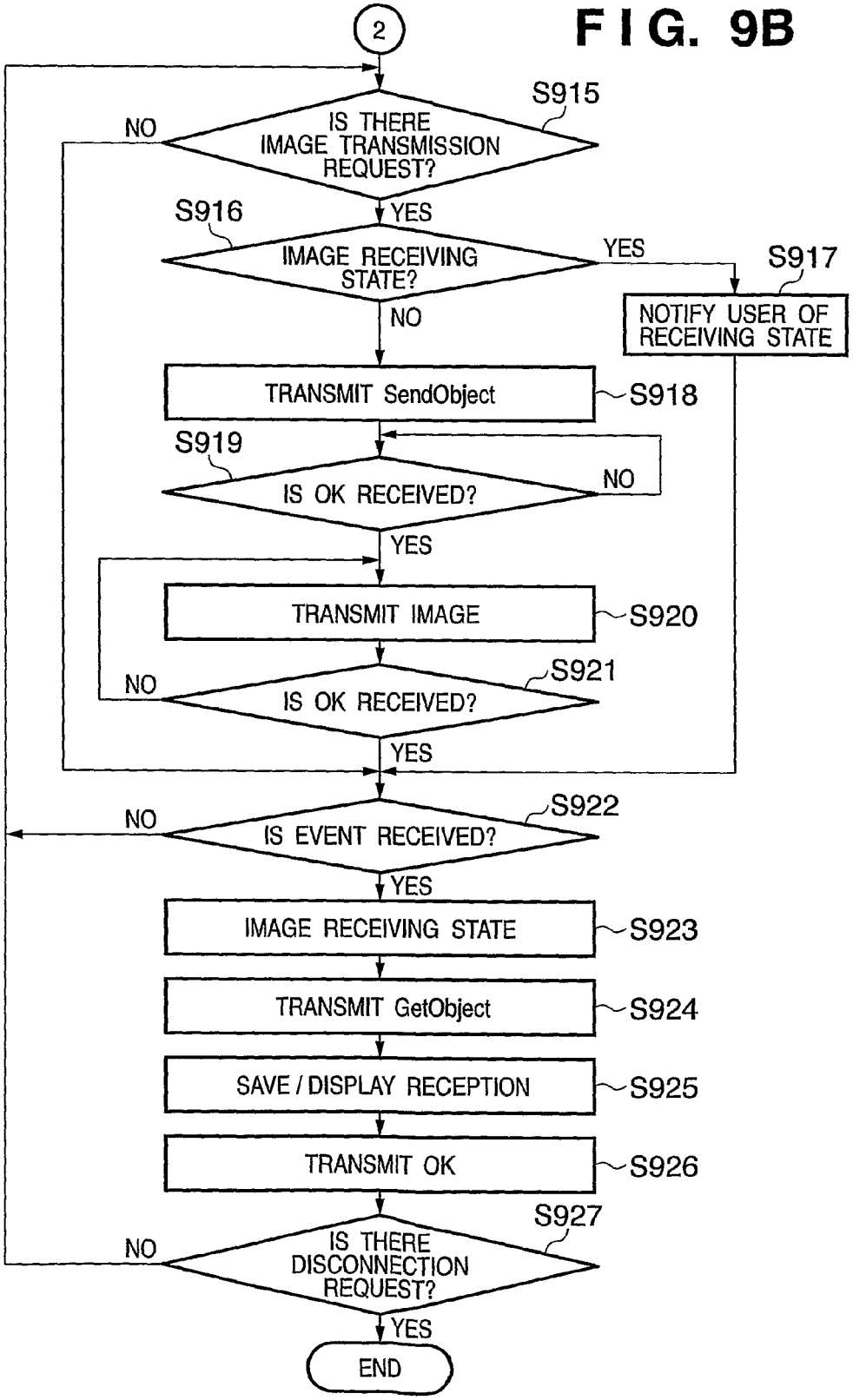
FIG. 9B is a flowchart showing the operation of the camera as a parameter acceptor when the cameras communicate with each other.

FIGS. 9A and 9B are flowcharts showing the operation of camera 2 as the parameter acceptor when the cameras communicate images with each other. When performing communication connection with camera 1, camera 2 as the parameter acceptor sets the roles of the individual communication layers as shown in FIG. 12.

When completing communication across the setting network, camera 2 first sets the physical layer as a joiner (S901). Camera 2 then sets the IP layer as an RARP client (S902). Camera 2 also sets the transport layer as a PTP/IP initiator (S903), and sets the control of the application layer as priority control=present (S904). After deciding on the roles of these layers, camera 2 starts the operation of the joiner as the role of the wireless physical layer (S905). When joining the network as the joiner, camera 2 transmits a probe request and repeats a scanning operation. Camera 2 determines by this scanning operation whether there is another terminal in the network. When receiving a probe response from camera 1 as the creator, camera 2 confirms camera 1 as the communication partner. If a probe response is received from an apparatus other than camera 1 registered as a connection destination, this means that an ad hoc network different from the network formed by camera 1 exists or an apparatus different from those registered as connection destinations exits in the network formed by camera 1. In this case, camera 2 can prevent faulty communication with an apparatus other than the desired communication partner by notifying the user of this information. Note that if camera 2 confirms another ad hoc network or an apparatus other than those registered as connection destinations, camera 2 can also automatically terminate wireless communication and notify the user of the information.

Then, camera 2 activates AUTOIPaddressing (S906). If its own address is determined by AUTOIP (S907), camera 2 activates an RARP client as the role of the IP layer (S908). To acquire the IP address of camera 1 as the communication partner, camera 2 transmits an RARP request based on the MAC address of camera 1 (S909), and waits for the reception of an RARP response (S910). Camera 2 acquires the IP address of camera 1 by receiving an RARP response from camera 1 as the RARP server (S911). Camera 2 then activates the PTP/IP initiator (S912), and transmits a PTP/IP connection request to camera 1 as the PTP/IP responder (S913). If a PTP/IP connection response is received from camera 1 (S914), camera 2 connects to camera 1 in the transport layer. Subsequently, camera 2 determines whether the user requests image transmission by operating the operation unit 312 of camera 2 (S915). If there is an image transmission request, camera 2 determines whether an image receiving state is set (S916). If the receiving state is set, camera 2 notifies the user of the receiving state (S917). If no receiving state is set, camera 2 transmits SendObject to notify camera 1 of image transmission (S918). If OK is received from camera 1 (S919), camera 2 transmits an image to camera 1 (S920), and waits for OK indicating transmission completion (S921). If OK indicating transmission completion is not received, camera 2 retransmits the image. If OK is received, the process advances to step S922. If EVENT as a transmission request is received from camera 1 (S922), camera 2 sets an image receiving state (S923), and transmits GetObject to camera 1(S924). Camera 2 waits for an image from camera 1 having received GetObject. If the image is received, camera 2 saves or displays the received image (S925), and transmits OK indicating reception completion (S926). If there is a request for disconnection from camera 1, camera 2 terminates the process.

When devices of the same type communicate with each other as described above, each role in the individual communication layers are related in advance to the operations of the roles during wireless communication parameter exchange. When actual communication starts, therefore, the users of these devices of the same type need not select the roles and operations in the individual layers, and can communicate data with each other between the devices without any cumbersome operations. A case in which the wireless network parameter exchanging process is performed between cameras and a printer will be explained below.

Figure 2A:
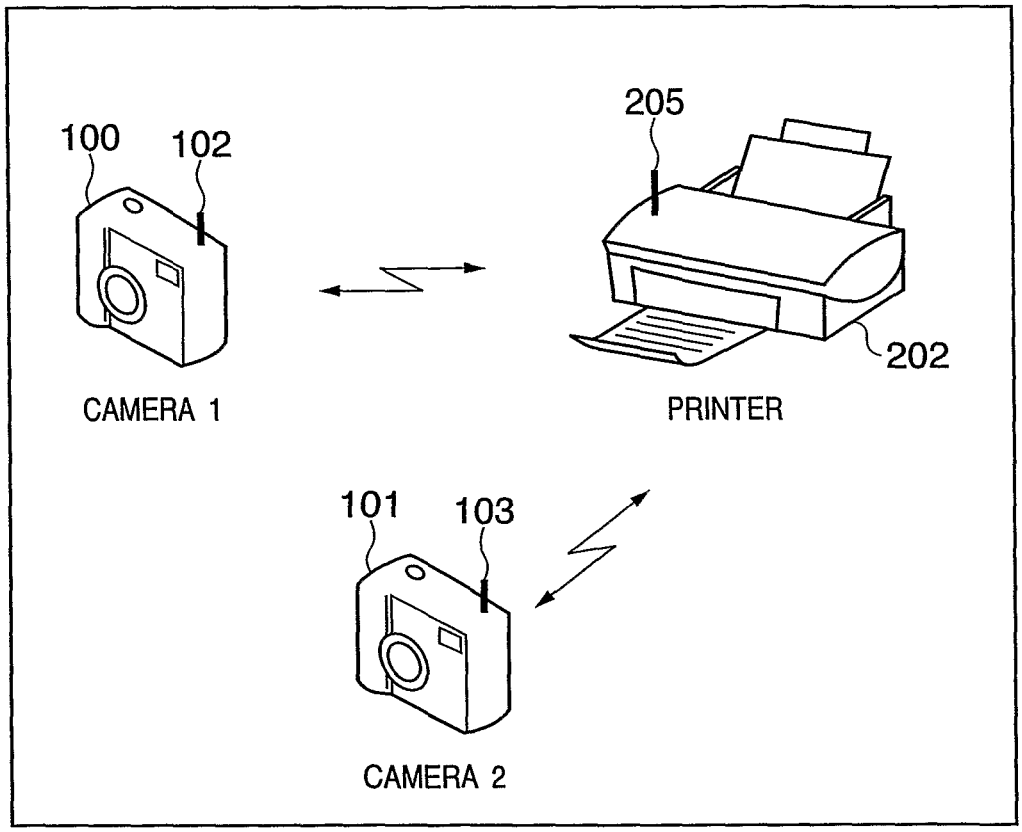
FIG. 2A is a view showing a case in which two cameras and a printer communicate with each other.

FIG. 2A shows an example of the system configuration. In FIG. 2A, reference numerals 100, 101, and 202 denote wireless communication apparatuses according to this embodiment, and they are a camera 1-100, camera 2-101, and printer 202. The cameras 1-100 and 2-101 are cameras 1 and 2 shown in FIG. 1. The printer 202 has a wireless communication function unit 205. The wireless communication function unit 205 also has a wireless LAN communication function, and allows three devices to directly communicate with each other in the ad hoc mode of a wireless LAN.

Figure 4:
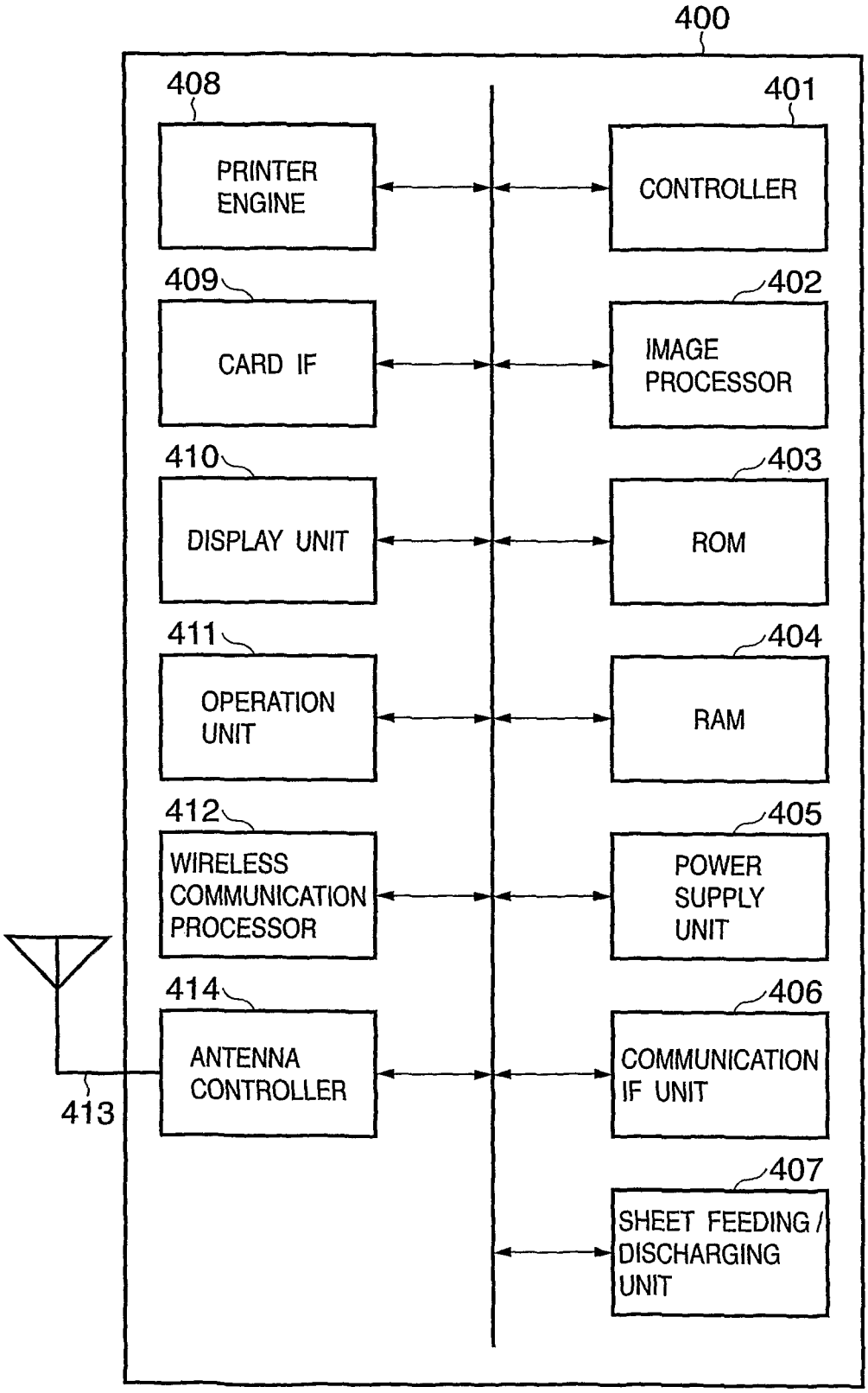
FIG. 4 is a block diagram of a printer.

FIG. 4 is a block diagram of the printer 202. Reference numeral 400 denotes a printer main body; 401, a controller which controls the printer 400; 402, an image processor which processes an image to be printed; and 403, a ROM storing control instructions, i.e., programs, and also storing programs for executing processing of the printer 202 to be described later. The ROM 403 also stores tables (FIGS. 12, 13, and 14) for deciding the roles of communication layers corresponding to the partner of the wireless network parameter exchanging process. Furthermore, the ROM 403 prestores the wireless communication parameters, such as the network identifier (SSID (Service Set Identifier)), encryption scheme, encryption key, authentication scheme, and authentication key, for forming a setting network. Reference numeral 404 denotes a RAM used as a work area of the controller 401; 405, a power supply unit; 406, a wired communication interface unit, e.g., a USB or IEEE1394; 407, a sheet feeding/discharging unit which feeds and discharges printer sheets; 408, a printer engine which controls printing of the printer; 409, a card interface which controls a recording medium card storing images; 410, a display unit which displays various data; 411, an operation unit including, e.g., a wireless communication parameter setting activation button; 412, a wireless communication processor which controls wireless LAN communication; 413, an antenna; and 414, an antenna controller.

Figure 13:
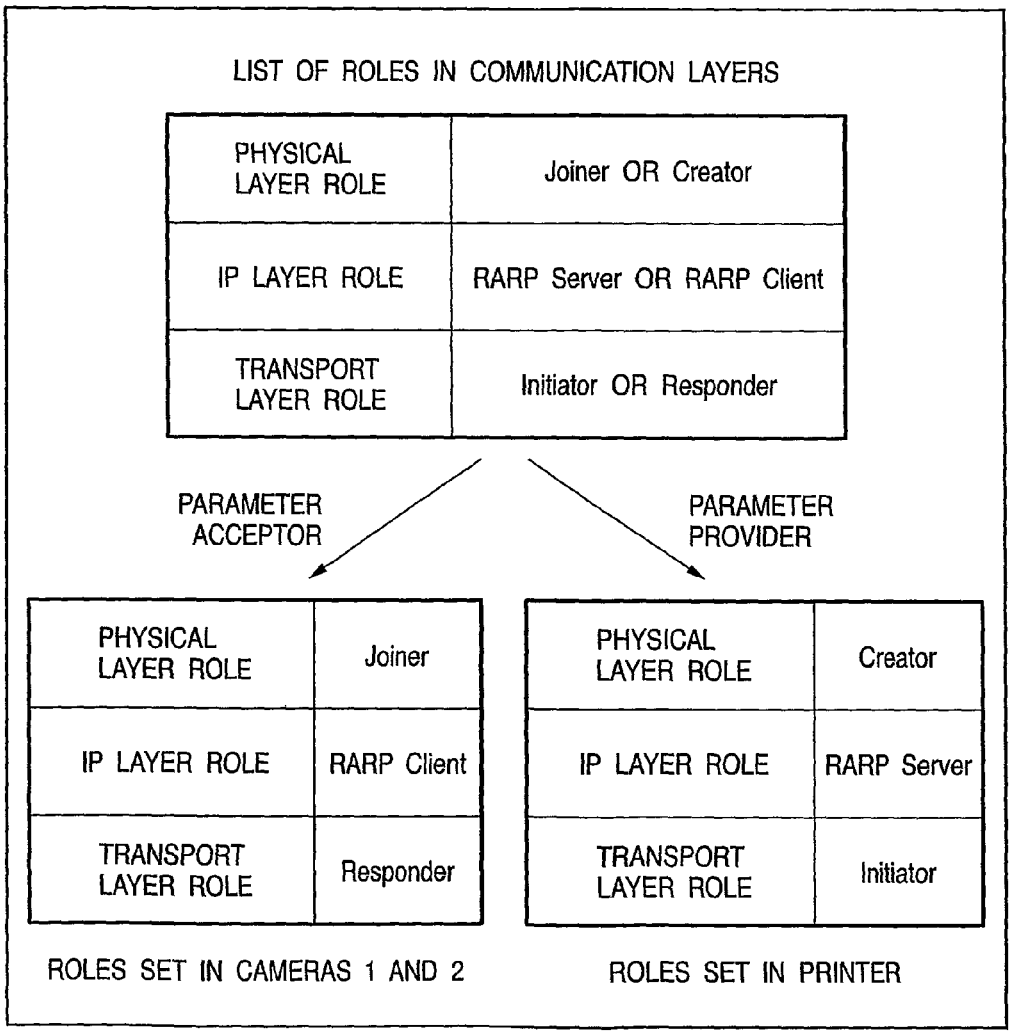
FIG. 13 is a view showing the roles of communication layers to be allocated to a parameter provider and parameter acceptor when a camera and printer communicate with each other.

FIG. 13 is a view showing the roles of the individual communication layers applied when performing the wireless network parameter exchanging process between the cameras and printer.

Assume that when performing the wireless network parameter exchanging process between the cameras and printer, the printer is a parameter provider, and the cameras are parameter acceptors. As shown in FIG. 13, therefore, the parameter provider plays the role of a creator of the physical layer, an RARP server the role of the IP layer, and a PTP/IP initiator the role of the transport layer. The parameter acceptor plays the role of a joiner of the physical layer, an RARP client the role of the IP layer, and a PTP/IP responder the role of the transport layer. Note that no priority control is set in the application layer because the camera transmits an image to the printer in this system.

Figure 6:
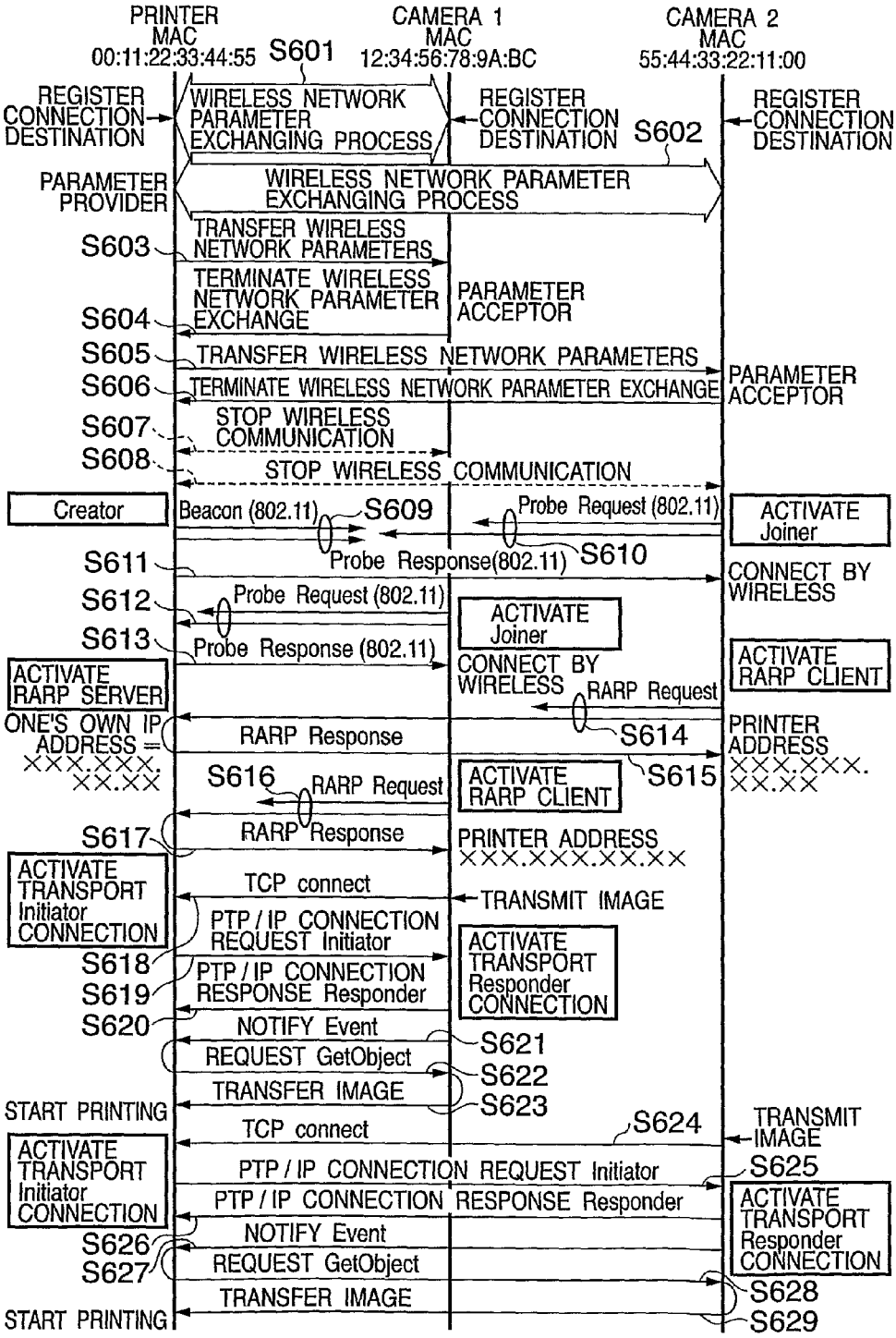
FIG. 6 is a sequence diagram showing operations when two cameras and a printer communicate with each other.

FIG. 6 is a sequence diagram showing operations from the wireless network parameter exchanging process to image communication when cameras 1 and 2 use the printer 202 to print images. Prior to communication, cameras 1 and 2 and the printer exchange the wireless communication parameters across the setting network in order to register each other's connection destination information (S601 and S602). In this exchanging process, whether the parameter exchanging process is performed between the cameras and printer is determined. If it is determined that the parameter exchanging process is performed between the cameras and printer, the roles shown in FIG. 13 are set.

In this processing, it is decided that the printer is the parameter provider and cameras land 2 are the parameter acceptors. The printer transfers the wireless communication parameters to camera 1 (S603), and camera 1 notifies the printer of the completion of the exchanging process (S604). Then, the printer transfers the wireless network parameters to camera 2 (S605). When the exchanging process is complete (S606), these devices stop wireless communication (S607 and S608), and reactivate wireless communication by selecting each other's connection destinations registered during the process. During this stage, these devices form a new network by using the wireless communication parameters exchanged by the exchanging process.

The printer activates itself as a creator of the wireless physical layer and sends a beacon (S609). Camera 2 is activated as a joiner of the wireless physical layer, transmits a probe request to perform a scanning operation (S610), and waits for a probe response from the printer (5611). Similarly, camera 1 is activated as a joiner of the wireless physical layer, transmits a probe request to perform a scanning operation (S612), and waits for a probe response (S613). Subsequently, the printer and cameras 1 and 2 decide on IP addresses by an AUTOIP function.

Then, the printer activates an RARP server and cameras 1 and 2 activate RARP clients, as the roles of the IP layer. Cameras 1 and 2 as the RARP clients transmit RARP requests to the printer (S614 and S616). The printer transmits RARP responses to cameras 1 and 2 (S615 and S617) to notify them of the IP address of the printer. As the roles of the transport layer, the printer activates a PTP/IP initiator, and cameras 1 and 2 activate PTP/IP responders.

If camera 1 generates an image transmission request after that, camera 1 performs TCP (Transmission Control Protocol) connection to the printer (S618). The printer having received the request transmits a PTP/IP connection request to camera 1 (S619). Camera 1 transmits a PTP/IP connection response to the printer (S620), thereby performing PTP/IP connection. Also, camera 1 notifies the printer of EVENT representing an image acquisition request (S621), and the printer having received this notification transmits GetObject as an image acquisition request to camera 1 (S622). Camera 1 having received GetObject transmits an image to the printer (S623), and the printer starts printing the received image. The same processing applies to a case in which camera 2 requests the printer to print an image, so an explanation thereof will be omitted (S624 to S629).

Figure 10A:
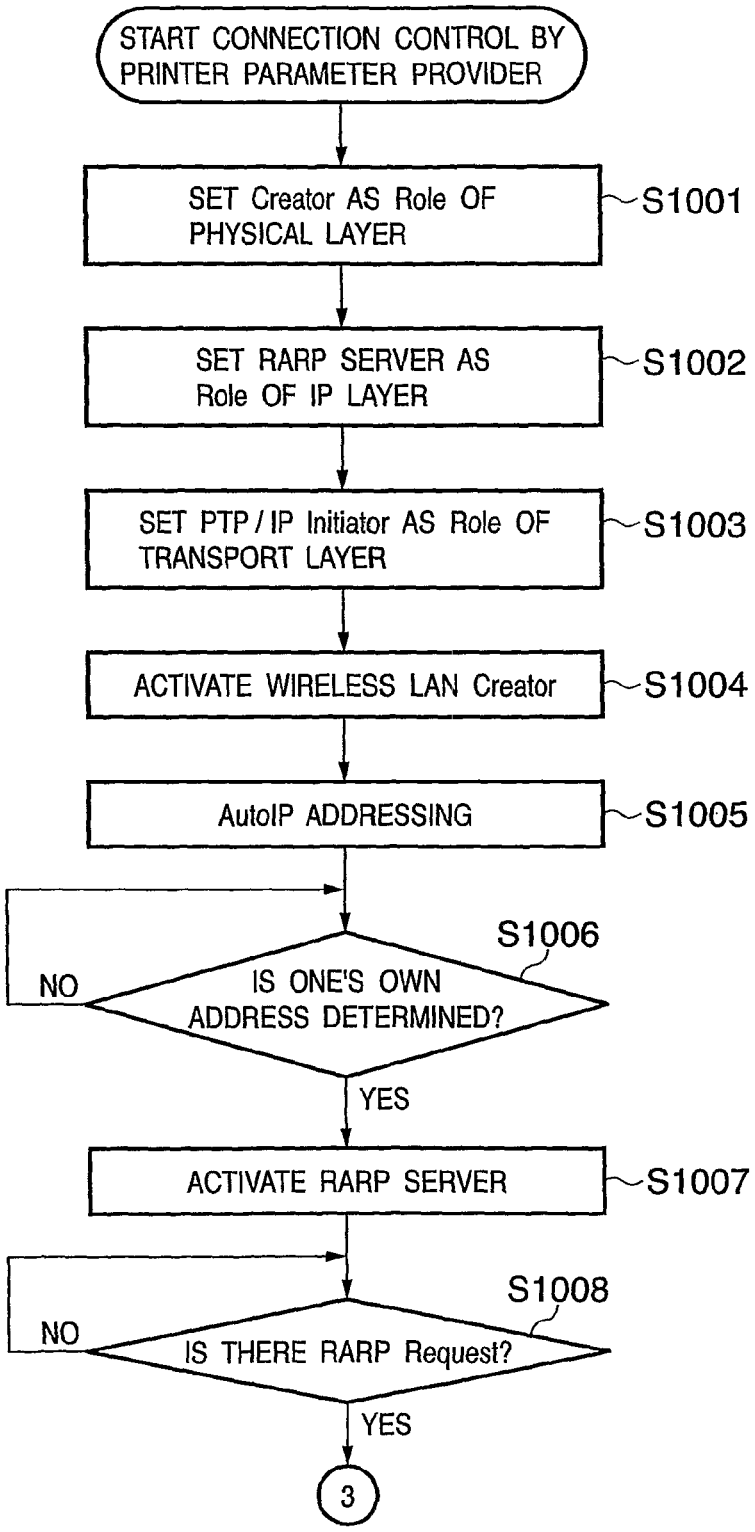
FIG. 10A is a flowchart showing the operation of a printer as a parameter provider when a camera and the printer communicate with each other.
Figure 10B:
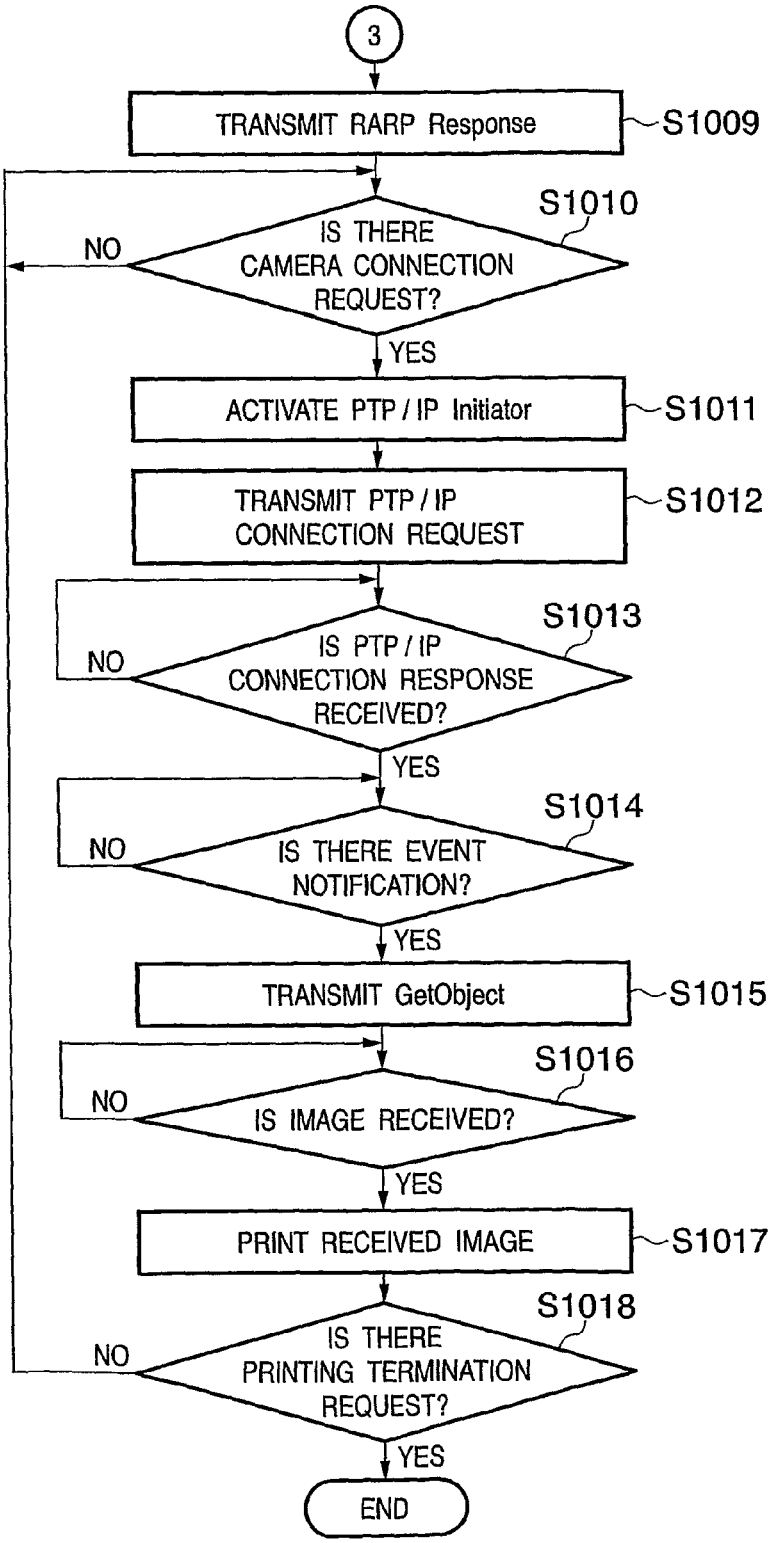
FIG. 10B is a flowchart showing the operation of the printer as a parameter provider when the camera and printer communicate with each other.

FIGS. 10A and 10B are flowcharts showing the operation of the printer when performing image communication and printing between the printer and cameras. When performing communication connection with cameras 1 and 2, the printer as the network parameter provider sets the roles of the individual communication layers as shown in FIG. 13.

When completing communication across the setting network, the printer sets the physical layer as a creator (S1001). The printer then sets the IP layer as an RARP server (S1002). The printer also sets the transport layer as a PTP/IP responder (S1003). After deciding on the roles of these layers, the printer starts the operation of the creator as the role of the wireless physical layer (S1004). When forming a network as the creator, the printer decides on its own IP address by AUTOIP (S1005 and S1006), and activates an RARP server as the role of the IP layer (S1007). After that, the printer can respond to an address request from another RARP client, and waits for an RARP request (S1008). This RARP request can be accepted at any timing after the RARP server is activated. When receiving an RARP request after that, the printer transmits an RARP response to notify the partner apparatus of its own IP address (S1009). The printer then waits for a TCP connection request from the camera (S1010). When receiving a TCP connection request, the printer activates a PTP/IP initiator as the role of the transport layer (S1011), and transmits a PTP/IP connection request to the camera having requested the connection (S1012). Subsequently, the printer waits for a connection response from a PTP/IP responder (S1013). When receiving a connection response, the printer waits for EVENT which is given when the partner camera generates an image data transmission request in PTP/IP communication (S1014). When receiving EVENT, the printer transmits GetObject to extract an image from the camera (S1015). The printer then waits for an image from the camera having received GetObject (S1016). When receiving an image, the printer prints the received image (S1017). If there is a printing termination request (S1018), the printer performs a termination process.

Figure 11A:
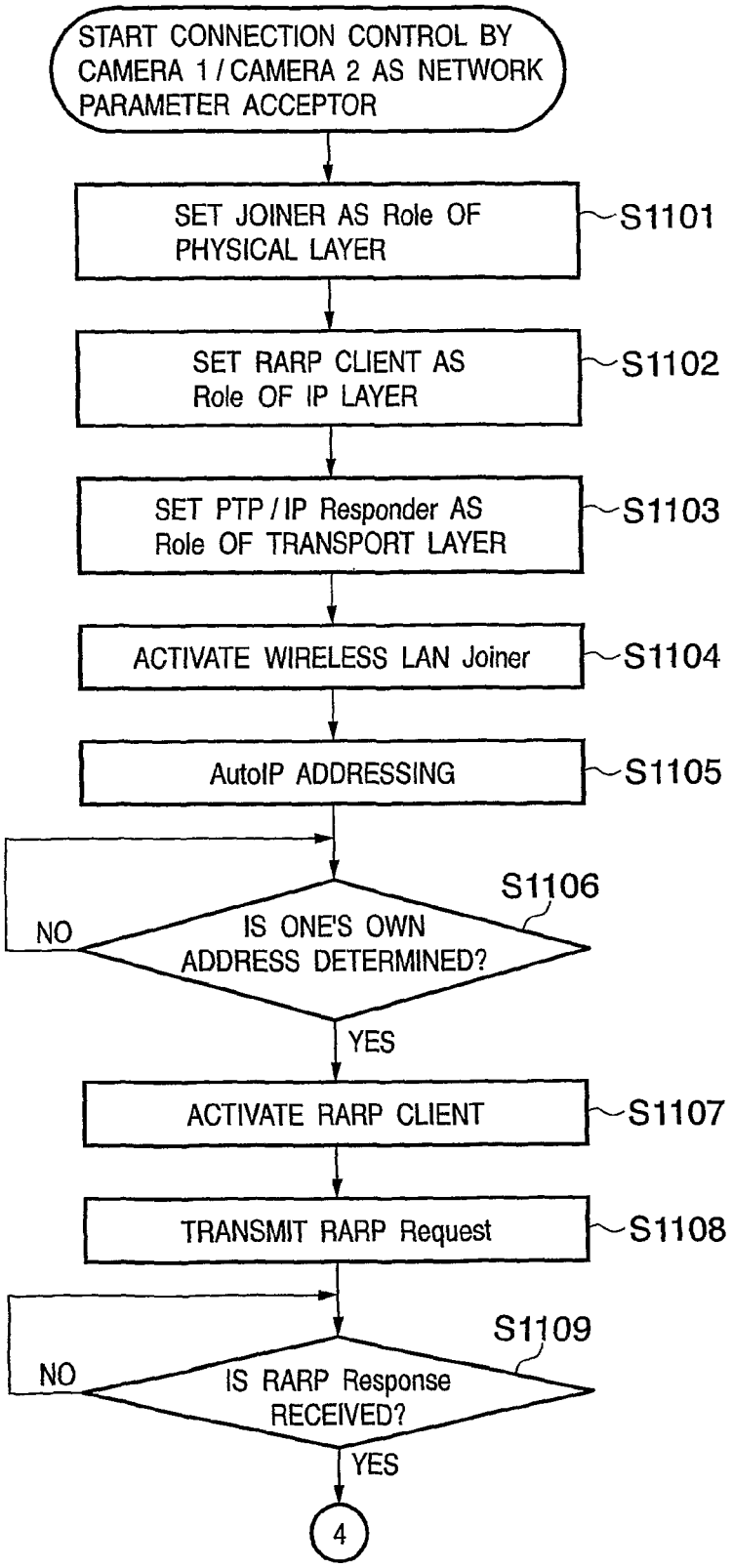
FIG. 11A is a flowchart showing the operation of a camera as a parameter acceptor when the camera and a printer communicate with each other.
Figure 11B:
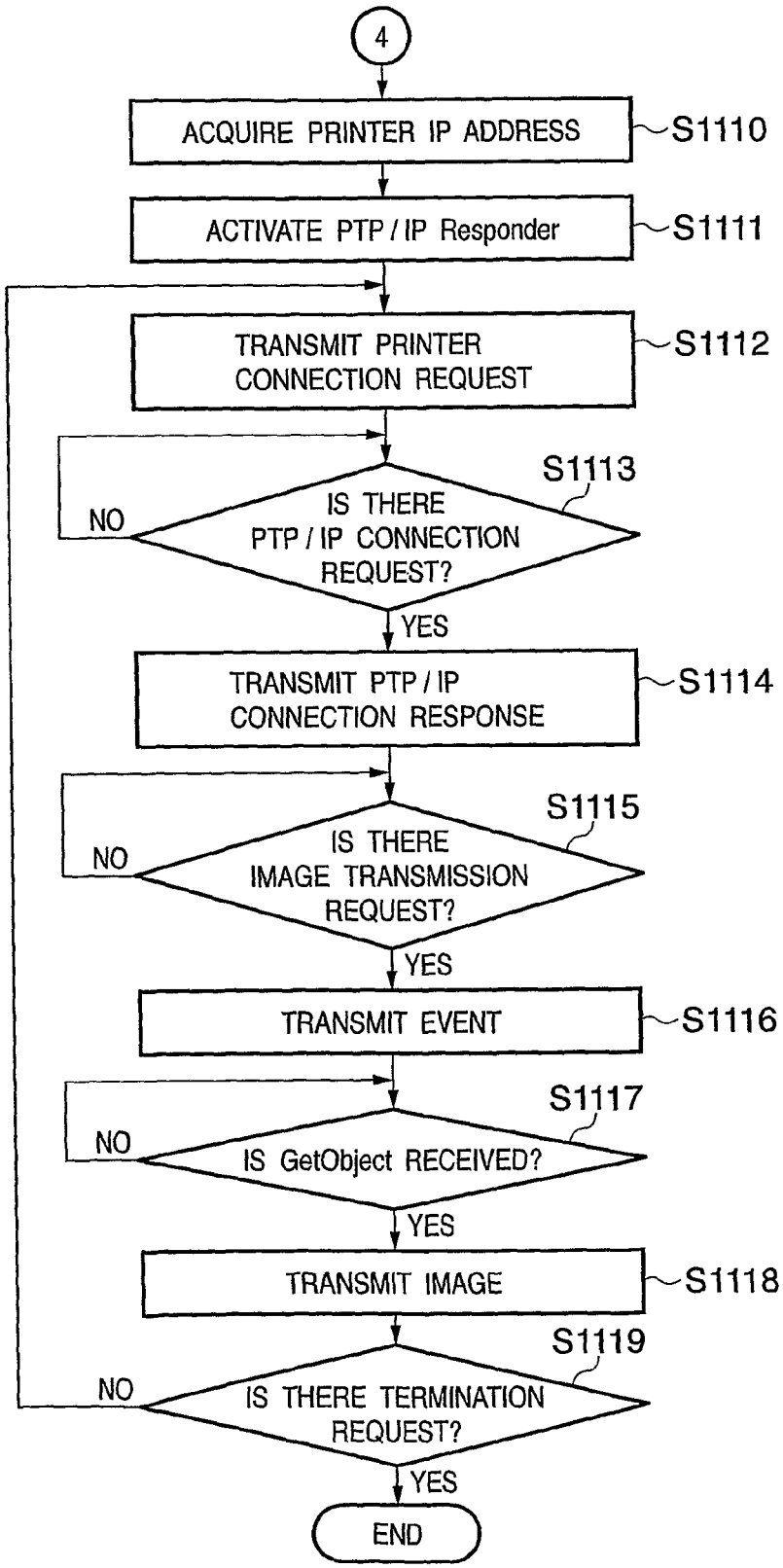
FIG. 11B is a flowchart showing the operation of the camera as a parameter acceptor when the camera and printer communicate with each other.

FIGS. 11A and 11B are flowcharts showing the operation of the cameras when performing image communication and printing between the printer and cameras. When performing communication connection with the printer 202, each of cameras 1 and 2 as the network parameter acceptors sets the roles of the individual communication layers as shown in FIG. 13.

When completing communication across the setting network, each camera sets the physical layer as a joiner (S1101). The camera then sets the IP layer as an RARP client (S1102). The camera also sets the transport layer as a PTP/IP responder (S1103). After deciding on the roles of these layers, the camera starts the operation of the joiner as the role of the wireless physical layer (S1104). When joining the network as the joiner, the camera activates AUTOIP addressing (51105). If its own IP address is determined by AUTOIP (S1106), the camera activates an RARP server as the role of the IP layer (S1107), and transmits an RARP request (S1108). If an RARP response from the printer as the RARP server is received (S1109), the camera can acquire the IP address of the printer (S1110). The camera then activates a PTP/IP responder (S1111), and transmits a TCP connection request to the printer (S1112). This connection request gives the printer a trigger for activating the operation of the PTP/IP initiator. If a PTP/IP connection request is transmitted from the PTP/IP initiator (S1113), the camera transmits a PTP/IP connection response (S1114). Subsequently, the camera determines whether the user has transmitted an image transmission request by operating the operation unit 312 (51115). If there is an image transmission request, the camera notifies the printer as the PTP/IP initiator of EVENT as a trigger of an image acquisition request (S1116). If GetObject is received from the printer (S1117), the camera transmits an image to the printer (S1118). If there is a printing process termination request (S1119), the camera performs a termination process. Note that in the above explanation, an image transmission request from the user is determined after the TCP connection and PTP/IP connection. However, TCP connection and PTP/IP connection may also be performed if image transmission is requested. It is of course also possible to detect an image transmission request by detecting a printing request because the partner is a printer.

When a plurality of different types of devices such as a printer and cameras communicate with each other as described above, each other's roles in the individual communication layers are related in advance to the operations of the roles during wireless communication parameter exchange. Accordingly, even when communicating with a device having no user operation unit or a device such as a printer having an operation unit unsuitable for complicated operations, the user need not select the roles and operations in the individual layers. Also, the service can be provided by the same operation as the method of communicating data between devices of the same type. In addition, the user can control communication channels so as not to perform communication between unwanted devices (in this case, cameras) without any complicated operations.

A case in which the wireless network parameter exchanging process is performed between cameras and a storage device such as a hard disk will be explained below.

Figure 2B:
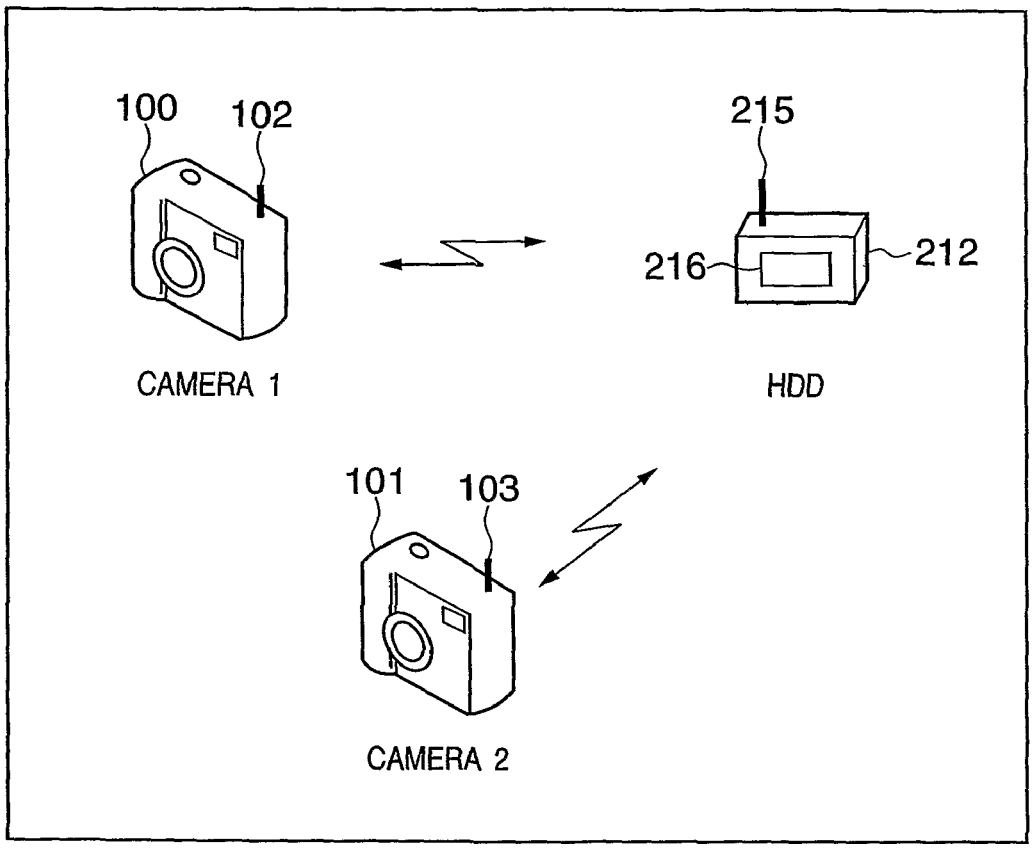
FIG. 2B is a view showing a case in which two cameras and an HDD communicate with each other.

FIG. 2B shows an example of the system configuration. In FIG. 2B, reference numerals 100, 101, and 212 denote wireless communication apparatuses according to this embodiment, and they are cameras 1-100 and 2-101 and a storage device (to be referred to as an HDD hereinafter) 212 such as a hard disk device. The cameras 1-100 and 2-101 are cameras 1 and 2 shown in FIG. 1. The HDD 212 has a wireless communication function unit 215 and display unit 216. The wireless communication function unit 215 also has a wireless LAN communication function, and allows three devices to directly communicate with each other in the ad hoc mode of a wireless LAN. The HDD 212 stores and manages images transmitted from cameras 1 and 2. The HDD 212 also transmits stored images to cameras 1 and 2 in accordance with requests from these cameras. Note that a memory of the HDD stores tables (FIGS. 12, 13, and 14) for deciding on the roles of communication layers corresponding to the partner of the wireless network parameter exchanging process. The memory also prestores the wireless communication parameters for forming a setting network.

FIG. 14 is a view showing the roles of the individual communication layers applied when performing the wireless network parameter exchanging process between the cameras and HDD.

Assume that when performing the wireless network parameter exchanging process between the cameras and HDD, the HDD is a parameter provider, and the cameras are parameter acceptors.

When the cameras and HDD communicate with each other, the roles of the physical layer are a joiner and creator as the functional roles in the ad hoc mode of a wireless LAN. The roles of the IP layer as an upper layer are an RARP server and RARP client. The roles of the transport layer as a still upper layer are an initiator (client) and responder (server). The transport layer uses two types of protocols, i.e., HTTP (Hyper Text Transfer Protocol) and PTP/IP. In this case, as shown in FIG. 14, cameras 1 and 2 are the parameter acceptors of wireless communication, and the HDD 212 is the parameter provider of wireless communication. Cameras 1 and 2 are set as registered partner information in the HDD 212 as the parameter provider. That is, the roles of the individual communication layers are decided on such that the role of the physical layer is a creator, the role of the IP layer is an RARP server, the role of the transport layer is a server (responder), and the protocol of the transport layer is HTTP. Also, the HDD is set as registered partner information in cameras 1 and 2 as the parameter acceptors. The roles are decided on such that the role of the physical layer is a joiner, the role of the IP layer is an RARP client, and the role of the transport layer is a client (initiator). It is also decided that the protocol of the transport layer is HTTP because the registered partner information is the HDD.

Figure 7:
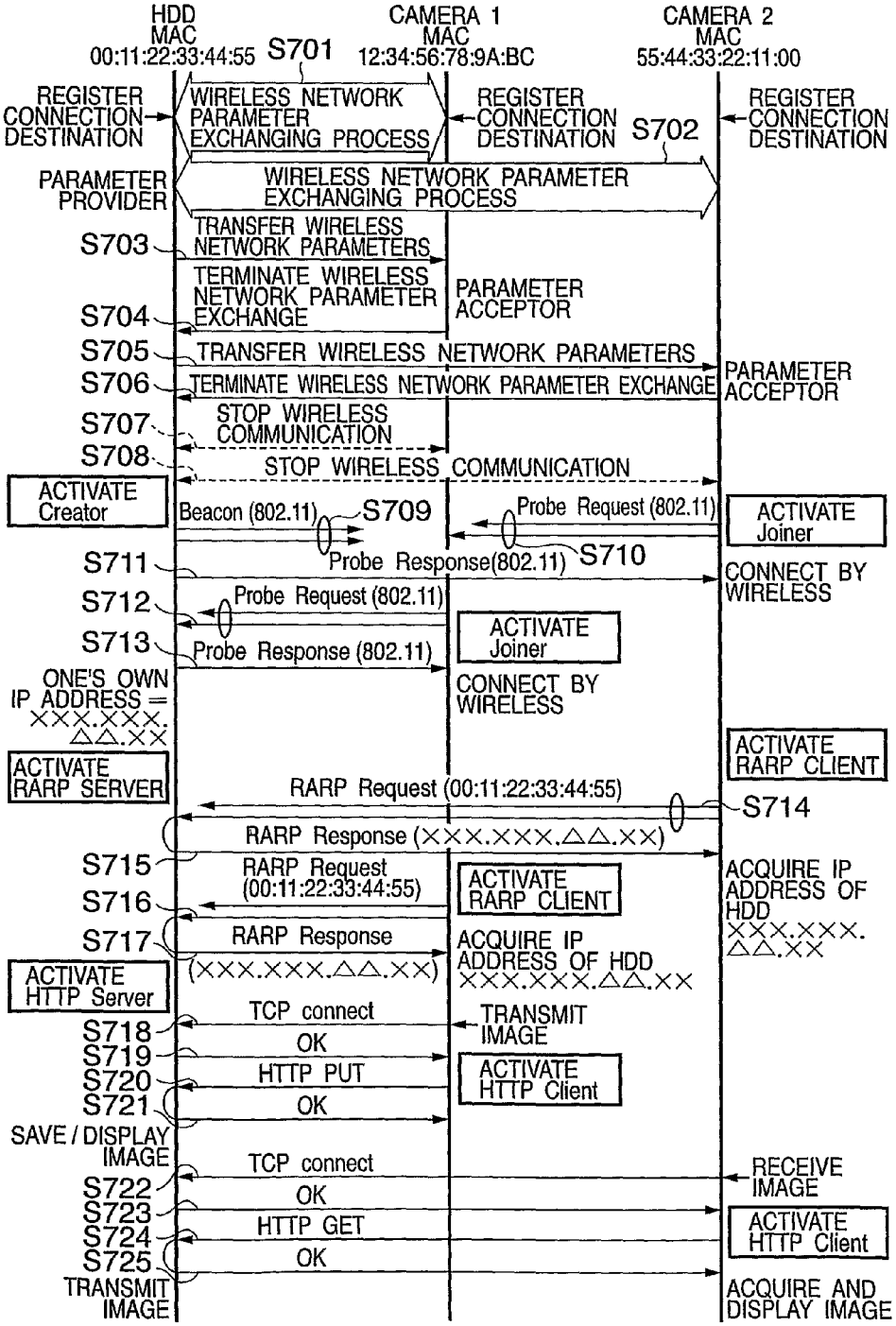
FIG. 7 is a sequence diagram showing operations when two cameras and an HDD communicate with each other.

FIG. 7 is a sequence diagram showing operations from the wireless network parameter exchanging process to image communication when cameras 1 and 2 transmit images to the HDD 212. Prior to communication, cameras 1 and 2 and the HDD exchange the wireless communication parameters in order to register each other's connection destination information (S701 and S702). In this exchanging process, whether the parameter exchanging process is performed between the cameras and HDD is determined. If it is determined that the parameter exchanging process is performed between the cameras and HDD, the roles shown in FIG. 14 are set.

In this processing, it is decided that the HDD is the parameter provider and cameras 1 and 2 are the parameter acceptors. The HDD transfers the wireless network communication parameters to camera 1 (S703), and camera 1 notifies the HDD of the completion of the exchanging process (S704). Then, the HDD transfers the wireless network parameters to camera 2 (S705). When the exchanging process is complete (S706), these devices stop wireless communication (S707 and S708), and reactivate wireless communication by selecting each other's connection destinations registered during the process. In this stage, these devices form a new network by using the wireless communication parameters exchanged by the exchanging process.

The HDD 212 activates itself as a creator of the wireless physical layer and sends a beacon (S709). Camera 2 activates itself as a joiner of the wireless physical layer, transmits a probe request to perform a scanning operation (S710), and waits for a probe response from the HDD 212 (S711). Similarly, camera 1 activates itself as a joiner of the wireless physical layer, transmits a probe request to perform a scanning operation (S712), and waits for a probe response (S713). Subsequently, the HDD 212 and cameras 1 and 2 decide on IP addresses by an AUTOIP function. Then, the HDD 212 activates an RARP server and cameras 1 and 2 activate RARP clients, as the roles of the IP layer. Cameras 1 and 2 as the RARP clients transmit RARP requests in order to acquire the IP address of the HDD 212 (S714 and S716). The HDD 212 45 having received the RARP requests transmits RARP responses to cameras 1 and 2 (S715 and S717) to notify them of its own IP address. As the roles of the transport layer, the HDD activates an HTTP server, and cameras 1 and 2 activate HTTP clients.

If camera 1 generates an image transmission request, camera 1 performs TCP connection to the HDD 212 (S718), and the HDD 212 having received the connection transmits a TCP connection response to camera 1 (S719). Camera 1 transmits a data transmission request to the HDD 212 by HTTP (S720). The HDD 212 having received the request notifies camera 1 of reception OK (S721), and camera 1 transmits an image by PUT processing using HTTP. The HDD 212 saves the image transmitted from the camera and displays the image on the display unit 216 at the same time. When camera 2 requests the HDD 212 to transmit a saved image, camera 2 performs TCP connection to the HDD 212 (S722). The HDD 212 having received the TCP connection transmits a TCP connection response to camera 2 (S723). Camera 2 transmits a data acquisition request to the HDD 212 by HTTP (S724). The HDD 212 having received the request notifies camera 2 of transmission OK (S725), and camera 2 acquires the image by GET processing using HTTP. Camera 2 saves the image transmitted from the HDD 212 and displays the image on the display unit (311) at the same time.

When a plurality of different types of devices such as a storage device and cameras communicate with each other as described above, each other's roles in the individual communication layers are related in advance to the operations of the roles during wireless communication parameter exchange. The roles of these layers corresponding to the roles during parameter exchange are automatically decided on. Also, the protocols of the data communication layer (transport layer) are selectively switched in accordance with the partner of parameter exchange. This allows the user to reliably control communication channel selection and protocol selection in accordance with the desired partner without forcing him or her to perform any complicated operations.

Figure 15:
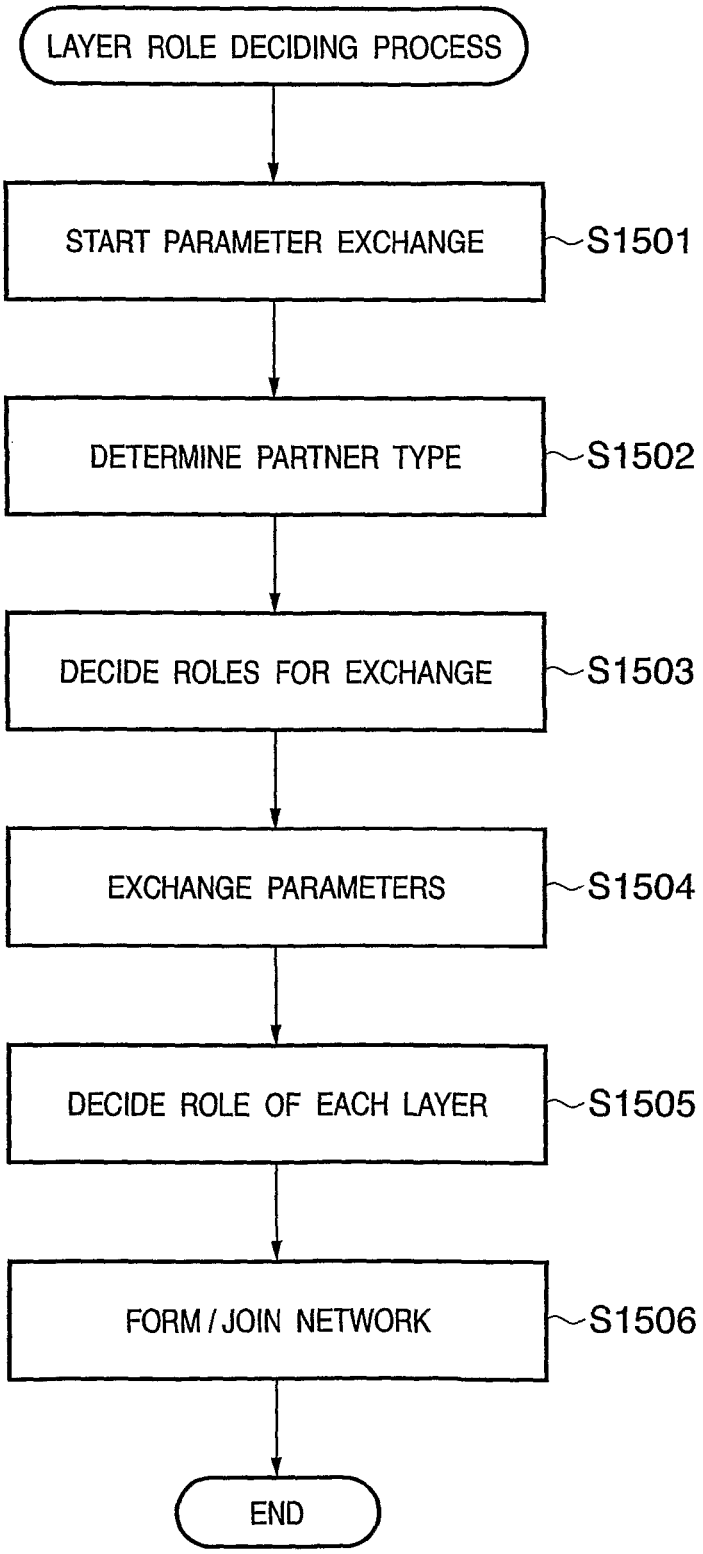
FIG. 15 is a flowchart showing an outline of processes executed by each device.

FIG. 15 shows an outline of the above embodiment executed by each device.

As shown in FIG. 15, each device starts exchanging the wireless network parameters across the setting network (S1501). In this exchanging process, each device determines the type of partner device (S1502), and decides on roles during the exchanging process (S1503). After that, each device performs parameter exchange for forming and joining a communication network (S1504). Then, each device decides on the roles of the individual layers corresponding to the roles during the parameter exchange (S1505). These roles are decided on in accordance with the type of partner of the exchanging process and the roles during the exchanging process. After deciding on the roles, each device forms a communication network by using the exchanged parameters, joins the network, and communicates an image or the like (S1506).

Note that the role of the IP layer is explained by taking the RARP server/client function which resolves the partner IP address as an example. However, the same effect can be obtained even when designating the role of an SSDP device/control point of UPnP (Universal Plug and Play). SSDP is an abbreviation of Simple Service Discover Protocol, and is a function of finding the partner terminal and resolving the IP address.

Note also that the role of the IP layer is explained by placing the focus on the function of resolving the IP address of the partner. However, the same effect can be obtained even by adding to this embodiment the role of a DHCP (Dynamic Host Configuration Protocol) client/DHCP server function of resolving one's own IP address.

The same effect can also be obtained even by adding to this embodiment the role of setting wireless security via the data link layer. For example, security control defined by IEEE802.11i has the roles of a supplicant (client) function and authenticator (server) function. The supplicant side requests the authenticator to authenticate the connection and determine whether to permit connection. When receiving this authentication request from the supplicant, the authenticator side authenticates the supplicant, determines whether to permit or reject the connection of the supplicant, and notifies the supplicant of the result. These roles may also be automatically decided on in accordance with the roles during parameter exchange.

Other roles corresponding to the roles during parameter exchange may also be automatically decided in other layers.

The type of partner device can be determined by exchanging each other's device types during the parameter exchanging process, or designated by the user by operating the operation unit.

Furthermore, this embodiment takes a wireless LAN as an example. However, the present invention is also applicable to other networks such as a UWB (Ultra Wide Band), wireless USB (Universal Serial Bus), Bluetooth (trademark), and ZigBee. The present invention is of course also applicable to a wired network as well as a wireless network.

In the above explanation, the roles of the individual layers are activated in turn during the process of network formation. This reduces the load on the device.

As described above, the roles of the individual, communication layers by which a plurality of communication apparatuses communicate with each other are decided on and activated as they are related to each other by using roles decided by the communication parameter exchanging function. Accordingly, the roles of these communication layers can be rapidly decided on without any complicated operations. Also, the user can connect and communicate with the partner device by selecting the parameters exchanged by the communication parameter exchanging function without caring about the roles in communication or the network configuration. Furthermore, different types of devices different in various factors such as roles and device types can clearly recognize each other's roles in communication in the individual communication layers before establishing communication. Therefore, communication can be started without activating any extra communication function.

Moreover, each device need not execute all the roles in the individual layers because the roles in these layers have been decided on. This reduces the processing load on the device.

As described above, the present invention can decide on the role in at least one communication layer without forcing the user to perform any complicated operation.

While the present invention has been described with reference to exemplary embodiments, it is to be understood that the invention is not limited to the disclosed exemplary embodiments. For example, the present invention may also be embodied as a non-transitory computer readable medium containing computer-executable instructions for performing a communication layer role deciding method by a communication apparatus. The scope of the following claims is to be accorded the broadest interpretation so as to encompass all such modifications and equivalent structures and functions.

This application is a National Stage filing of PCT application No. PCT/JP2007/053241, filed on Feb. 15, 2007, which claims the benefit of priority from Japanese Patent Application No. 2006-040959, filed Feb. 17, 2006, and No. 2006-354429, filed Dec. 28, 2006, both of which are hereby incorporated by reference herein in their entirety.

The invention claimed is:

1. A communication apparatus comprising:

a decision unit adapted to decide [on] a role as a communication parameter provider or a communication parameter accepter in a wireless network parameter sharing process when sharing communication parameters for a network with another apparatus, wherein the communication parameters comprise at least one of a network identifier, encryption scheme, encryption key, authentication scheme, and authentication key;

a memory adapted to store information specifying roles of a plurality of communication layers corresponding to the role for when sharing the communication parameters;

a sharing unit adapted to perform the wireless network parameter sharing process with [said] *the* another apparatus in accordance with the role in the wireless network parameter sharing process decided [on] by the decision unit and share the communication parameters for the network;

a forming unit adapted to form the network with [said] *the* another apparatus based on the communication parameters shared at the sharing unit;

a setting unit adapted to set roles in a plurality of communication layers of the network corresponding to the role in the wireless network parameter sharing process decided [on] by [said] *the* decision unit based on the information stored in the memory, wherein the plurality of communication layers include at least one of a data link layer, an IP (Internet Protocol) layer, a transport layer, and an application layer, *and wherein a role in the data link layer includes an authenicator and a supplicant*.

2. A communication apparatus according to claim 1, further comprising:

an execution unit adapted to execute a communication function based on the roles in the communication layers set by [said] *the* setting unit.

3. A communication apparatus according to claim 1, wherein [said] *the* decision unit decides [on] one of a communication parameter provider and a communication parameter acceptor as the role when setting the communication parameter.

4. A communication apparatus according to claim 1, wherein [said] *the* setting unit sets one of a role of forming a network and a role of joining a network formed by another apparatus, as a role of one communication layer.

5. A communication apparatus according to claim 1, wherein [said] *the* setting unit sets one of a server and a client as a role of one communication layer.

6. A communication apparatus according to claim 1, wherein [said] *the* setting unit sets, as a role of one communication layer, one of a side of requesting connection in the communication layer and a side of accepting a connection request.

7. A communication apparatus according to claim 1, wherein [said] *the* setting unit sets one of a side of requesting authentication and a side of performing authentication, as a role of one communication layer.

8. A communication apparatus according to claim 1, wherein [said] *the* setting unit sets one of a side having priority control and a side having no priority control, as a role of one communication layer.

9. A communication apparatus according to claim 1, further comprising:

a determination unit adapted to determine a type of communication partner; and a selection unit adapted to select a communication protocol in accordance with the determination by [said] *the* determination unit.

10. A communication apparatus according to claim 1, further comprising a determination unit adapted to determine a type of communication partner, wherein

[said] *the* setting unit sets the roles in [said] *the* plurality of communication layers in accordance with the role decided [on] by [said] *the* decision unit and the type of communication partner determined by [said] *the* determination unit.

11. A communication apparatus according to claim 1, further comprising an operation unit adapted to allow a user to instruct the decision unit to start to decide [on] a role when setting the communication parameter.

12. A communication layer role deciding method by a communication apparatus, comprising [steps of]:

deciding [on] a role as a communication parameter provider or a communication parameter accepter in a wireless network parameter sharing process when sharing communication parameters for a network with another apparatus, wherein the communication parameters comprise at least one of a network identifier, encryption scheme, encryption key, authentication scheme, and authentication key;

storing in a memory information specifying roles of a plurality of communication layers corresponding to the role for when sharing the communication parameters;

performing the wireless network parameter sharing process with [said] *the* another apparatus in accordance with the role in the wireless network parameter sharing process decided [on] by the deciding step and sharing the communication parameters for the network;

forming the network with [said] *the* another apparatus based on the communication parameters shared at the sharing step *by transmitting a beacon in a wireless network for which the shared communication parameters are used or by transmitting a probe reguest to the another communication apparatus and receiving a probe response from the another communication apparatus in a wireless network for which the shared communication parameters are used*;

setting roles in a plurality of communication layers of the network corresponding to the role in the wireless network parameter sharing process decided [on] at [said] *the* deciding step in the wireless network parameter sharing process, wherein the plurality of communication layers include at least one of a data link layer, an IP (Internet Protocol) layer, a transport layer, and an application layer, *and wherein a role in the data link layer includes an authenticator and a supplicant and a role in the IP layer includes a DHCP server and a DCHP client*.

13. A communication layer role deciding method according to claim 12, wherein the [step of] deciding [on] a role when setting the communication parameter is performed based on an operation by a user at an operation unit.

14. A non-transitory computer readable medium containing computer-executable instructions for performing a communication layer role deciding method by a communication apparatus, the medium comprising:

computer-executable instructions for deciding [on] a role as a communication parameter provider or a communication parameter accepter in a wireless network parameter sharing process when sharing communication parameters for a network with another apparatus, wherein the communication parameters comprise at least one of a network identifier, encryption scheme, encryption key, authentication scheme, and authentication key;

computer-executable instructions for storing in a memory information specifying roles of a plurality of communication layers corresponding to the role for when sharing the communication parameters;

computer-executable instructions for performing the wireless network parameter sharing process with [said] *the* another apparatus in accordance with the decided role in the wireless network parameter sharing process and sharing the communication parameters for the network;

computer-executable instructions for forming the network with [said] *the* another apparatus based on the shared communication parameters *by transmitting a beacon in a wireless network for which the shared communication parameters are used or by transmitting a probe request to the another communication apparatus and receiving a probe response from the another communication apparatus in a wireless network for which the shared communication parameters are used*;

computer-executable instructions for setting roles in a plurality of communication layers of the network corresponding to the decided role in the wireless network parameter sharing process based on the information stored in the memory, wherein the plurality of communication layers include at least one of a data link layer, an IP (Internet Protocol) layer, a transport layer, and an application layer*, and wherein a role in the data link layer includes an authenticator and a supplicant and a role in the IP layer includes a DHCP server and a DHCP client*.

*15. A communication apparatus which is capable of communicating wirelessly with another communication apparatus by operating as either a first role of providing communication parameters or a second role of receiving communication parameters, wherein the communication parameters include at least one of a network identifier, an encryption scheme, an encryption key, an authentication scheme, or an authentication key, the communication apparatus comprising:*

*a processor; and*

*a non-transitory computer readable storage medium having computer readable program code embodied in the medium, that when executed by the processor of the communication apparatus controls the communication apparatus to perform operations comprising:*

*storing in a memory information specifying roles of the communication apparatus in each of a data link layer and an IP (Internet Protocol) layer corresponding to each of the first role and the second role;*

*sharing the communication parameters between the communication apparatus and the another communication apparatus by providing the communication parameters in a case that the communication apparatus operates as the first role, and by receiving the communication parameters in a case that the communication apparatus operates as the second role;*

*forming a wireless network with the another communication apparatus based on the shared communication parameters by transmitting a beacon in a wireless network for which the shared communication parameters are used or by transmitting a probe request to the another communication apparatus and receiving a probe response from the another communication apparatus in a wireless network for which the shared communication parameters are used; and*

*automatically setting, based on the information stored in the memory, roles of the communication apparatus in each of the data link layer and the IP layer of the formed wireless network corresponding to the role of the communication apparatus for when sharing the communication parameters, wherein the role in the data link layer includes an authenticator and a supplicant and the role in the IP layer includes a DHCP server and a DHCP client.*

*16. A communication apparatus according to claim 15, wherein information specifying a role of a physical layer corresponding to a role for when sharing the communication parameters is stored in the memory.*

*17. A communication apparatus according to claim 16, wherein the role in the IP layer includes a role for notifying an IP address and a role for acquiring an IP address and the role in the physical layer includes a role for creating a wireless network and a role for joining a wireless network.*

*18. A communication apparatus according to claim 15, wherein the communication apparatus and the another communication apparatus perform direct communication with each other in the formed wireless network.*

*19. A communication apparatus according to claim 15, wherein the formed wireless network is a network of a wireless LAN.*

*20. A communication apparatus according to claim 15, wherein the authenticator is a role which authenticates the supplicant and the supplicant is a role which requests the authenticator to authenticate.*

*21. A communication apparatus according to claim 15, wherein the authenticator and the supplicant are defined by IEEE802.11i.*

*22. A control method of a communication apparatus that is capable of communicating wirelessly with another communication apparatus by operating as either a first role of providing communication parameters or a second role of receiving communication parameters, wherein the communication parameters include at least one of a network identifier, an encryption scheme, an encryption key, an authentication scheme, or an authentication key, the method comprising:*

*storing in a memory information specifying roles of the communication apparatus in each of a data link layer and an IP (Internet Protocol) layer corresponding to each of the first role and the second role;*

*sharing the communication parameters between the communication apparatus and the another communication apparatus by providing the communication parameters in a case that the communication apparatus operates as the first role, and by receiving the communication parameters in a case that the communication apparatus operates as the second role;*

*forming a wireless network with the another communication apparatus based on the shared communication parameters by transmitting a beacon in a wireless network for which the shared communication param-*

*eters are used or by transmitting a probe request to the another communication apparatus and receiving a probe response from the another communication apparatus in a wireless network for which the shared communication parameters are used; and*

*automatically setting, based on the information stored in the memory, roles of the communication apparatus in each of the data link layer and the IP layer of the formed wireless network corresponding to the role of the communication apparatus for when sharing the communication parameters, wherein the role in the data link layer includes an authenticator and a supplicant and the role in the IP layer includes a DHCP server and a DHCP client.*

*23. A non-transitory computer readable medium containing computer-executable instructions that cause a communication apparatus to perform a control method, wherein the communication apparatus is capable of communicating wirelessly with another communication apparatus by operating as either a first role of providing communication parameters or a second role of receiving communication parameters, wherein the communication parameters include at least one of a network identifier, an encryption scheme, an encryption key, an authentication scheme, or an authentication key, the control method comprising:*

*storing in a memory information specifying roles of the communication apparatus in each of a data link layer and an IP (Internet Protocol) layer corresponding to each of the first role and the second role;*

*sharing the communication parameters between the communication apparatus and the another communication apparatus by providing the communication parameters in a case that the communication apparatus operates as the first role, and by receiving the communication parameters in a case that the communication apparatus operates as the second role;*

*forming a wireless network with the another communication apparatus based on the shared communication parameters by transmitting a beacon in a wireless network for which the shared communication parameters are used or by transmitting a probe request to the another communication apparatus and receiving a probe response from the another communication apparatus in a wireless network for which the shared communication parameters are used; and*

*automatically setting, based on the information stored in the memory, roles of the communication apparatus in each of the data link layer and the IP layer of the formed wireless network corresponding to the role of the communication apparatus for when sharing the communication parameters, wherein the role in the data link layer includes an authenticator and a supplicant and the role in the IP layer includes a DHCP server and a DHCP client.*

* * * * *